United States Patent
Hidaka

(10) Patent No.: US 6,961,153 B1
(45) Date of Patent: Nov. 1, 2005

(54) IMAGE INPUTTING APPARATUS, IMAGE INPUTTING SYSTEM AND CONTROL METHOD OF IMAGE INPUTTING APPARATUS

(75) Inventor: Atomu Hidaka, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/453,692

(22) Filed: Dec. 3, 1999

(30) Foreign Application Priority Data

Dec. 10, 1998 (JP) .......................................... 10-351548

(51) Int. Cl.[7] .................................................. H04N 1/32
(52) U.S. Cl. ........................ 358/468; 358/474; 358/1.6; 382/312
(58) Field of Search .................... 358/1.6, 468, 402, 358/461, 400, 474, 498, 1.11, 1.18, 437, 444, 404, 296, 401, 505, 486, 497; 382/312

(56) References Cited

U.S. PATENT DOCUMENTS

| | | | | |
|---|---|---|---|---|
| 4,905,098 A | * | 2/1990 | Sakata ........................ | 358/468 |
| 5,128,858 A | * | 7/1992 | Kitabata ..................... | 700/122 |
| 5,796,928 A | * | 8/1998 | Toyomura et al. ........... | 358/1.6 |
| 5,974,232 A | * | 10/1999 | Kamiya ...................... | 709/238 |
| 6,314,213 B1 | * | 11/2001 | Miyahara et al. ........... | 382/312 |

FOREIGN PATENT DOCUMENTS

| | | |
|---|---|---|
| JP | 61-23163 | 1/1986 |
| JP | 9-102853 | 4/1997 |
| JP | 10-275209 | 10/1998 |

* cited by examiner

*Primary Examiner*—Edward Coles
*Assistant Examiner*—Heather D. Gibbs
(74) *Attorney, Agent, or Firm*—Oliff & Berridge, PLC

(57) ABSTRACT

There is provided an image inputting apparatus which allows various processing while minimizing originals to be reset in an original feeder. The image inputting apparatus is provided with a scan processing command for operating only an image reading section and a feed processing command for operating only an original feeder section with respect to an external control unit such as a computer. When the external control unit issues the feed processing command, an image input control section of the image inputting apparatus receiving the command recognizes that the command is a command for controlling the original feeder section and instructs an original feeder monitoring control section to feed the original. Receiving the instruction, the original feeder monitoring control section controls the original feeder section to feed one original onto a platen. As a result of that the feeding process and the scanning process can be specified individually, it becomes possible to scan the original on the platen repeatedly without feeding it even when the original feeder section is utilized.

18 Claims, 15 Drawing Sheets

FIG. 6

| COMMAND NO. | COMMAND/RESPONSE NAME | PARAMETER NO. | TYPE OF PARAMETERS WHICH CAN BE SET | EXAMPLES OF PARAMETER SET VALUE |
|---|---|---|---|---|
| 00 | PROCESS COMPLETED (NORMALLY END) | 0001 | STATE OF ORIGINAL | NONE (0), EXIST (1) |
| 01 | INSTRUCT TO START SCAN JOB | 0001 | DISPLAY MESSAGE | NONE (0), EXIST (1) |
|  |  | 0002 | INTERRUPT PROHIBITED | NONE (0), EXIST (1) |
| 02 | INSTRUCT TO END SCAN JOB |  |  |  |
| 10 | SET JOB PARAMETER | 0000 | TYPE OF EFFECTIVE SCANNING PROCESSES | PRE-SCAN (0), MAIN-SCAN (1) |
|  |  | 0001 | ORIGINAL PROCESSING OF ORIGINAL FEEDER SECTION | END (0), WAIT FOR INSTRUCTION (1) |
|  |  | 0101 | SET PAPER SIZE | HORIZONTAL AND VERTICAL SIZES |
|  |  | 0201 | COLOR SPACE | BLACK AND WHITE (1), RGB (100) |
|  |  | 0202 | NUMBER OF COLORS | NUMBER OF BITS |
|  |  | 0301 | MAGNIFICATION/ REDUCTION FACTOR | MAGNIFICATION FACTOR (INDICATE 0.1%) |
|  |  | < OMITTED HEREINAFTER BECAUSE THERE ARE MANY MORE PARAMETERS > |  |  |
| 20 | SET TEMPORARY PARAMETER | < OMITTED BECAUSE SAME WITH SETTING OF JOB PARAMETERS> |  |  |
| 30 | ORIGINAL PRE-SCANNING PROCESS |  |  |  |
| 40 | ORIGINAL MAIN SCANNING PROCESS |  |  |  |
| 50 | ORIGINAL FEEDING PROCESS | 0001 | NUMBER OF ORIGINALS FED | NUMBER OF ORIGINALS TO BE FED |
| FF | PROCESS COMPLETED (ABNORMALLY END) | 0001 | STATE OF ORIGINAL | NONE (0), EXIST (1) |
|  |  | 0101 | TYPE OF ERROR | ERROR NO. |

IMAGE INPUTTING APPARATUS, IMAGE INPUTTING SYSTEM AND CONTROL METHOD OF IMAGE INPUTTING APPARATUS

BACKGROUND OF THE INVENTION

1. Field of the Invention

The present invention relates to an image inputting apparatus for reading an image of an original and more specifically to an image inputting apparatus fitted with an original feeder for automatically feeding the original to a reader section.

2. Description of the Related Art

Some image inputting apparatus such as a scanner for optically reading an image of an original to transform it into digital image data is fitted with an automatic original feeder called an ADF (Auto-Document Feeder) (hereinafter referred to as an original feeder) to continuously read originals.

Lately, an original feeder whose operation is fast (especially which rises quickly in starting it) and accurate, whose operating speed can be set freely and which hardly clogs originals have come to be developed. Accordingly, it has become possible to perform complex original feeding operations by changing the operating methods.

Still more, because the price of fast color printers has become low lately and there often arise cases of printing a large volume of color documents, a need for inputting a large volume of color originals, i.e., the raw material of the print output, quickly without resorting to man-power is increasing and the importance of the original feeder in the image inputting apparatus is increasing more and more.

Various processing parameters may be specified for the reading process to obtain a desired image in the image inputting apparatus. The specification of the processing parameters is important especially in reading a color original whose tint and others are questioned.

The conventional image inputting apparatus fitted with the original feeder is generally provided with two modes of reading an original manually placed on a platen (original table) and of continuously reading all of originals placed on the original feeder.

TWAIN (a protocol group showing a general procedure of an image input control method from an image reader such as scanner. Named from a working group who created it) has been well known as a protocol used in controlling the image inputting apparatus from an external control unit such as a personal computer in DTP (desk-top publishing). A procedure for controlling a typical image inputting process using a standard image editing software conforming to the general protocol such as TWAIN will be explained below briefly.

In case of the mode of replacing originals on the platen manually without using any original feeder, the user sets the originals on the platen and instructs to carry out pre-scan in rough resolution at first. As a result, the obtained image is displayed on a screen. Next, the user specifies an area of a desirable image (referred to as a cut-out area hereinbelow) on the screen display and instructs to carry out main scan (high-resolution scan). The result of the main scan is also displayed on the screen. When the area displayed as the result of the main scan is not the desired area, the user sets the cut-out area again on the pre-scan image and carries out main scan again. When it is the desired area, the user adjusts various processing parameters such as the density and tint of the image by making reference to the screen display showing the result of the main scan and instructs to carry out main scan again. Then, the user repeats the adjustment of the parameters and the process of the main scan until when the desired image is obtained. When the user obtains the desired image, the user ends the process by storing the image in a desirable memory. The above-mentioned processes are repeated while manually replacing the originals on the platen one by one in the process not using the original feeder.

In case of the mode of utilizing the original feeder, the user must take out one original (e.g., the top page) among a series of originals to be read to set on the platen for example at first and decide various processing parameters such as the cut-out area, density and tint by the same method with the mode of manually placing originals. When the user decides the processing parameters, the user sets all of the originals on the original feeder and instructs to carry out main scan. Then, the originals are fed one by one from the original feeder to the platen, are read in accordance to the processing parameters and are stored in a predetermined memory.

Thus, the conventional protocol for controlling the image inputting apparatus has speculated only the mode of reading all of the originals placed on the feeder continuously under the same processing parameters such as the cut-out area and tint in using the original feeder and the conventional image inputting apparatus has allowed the original feeder to be utilized only in such mode. Therefore, the original feeder could not be utilized for the purpose of reading the originals by changing the processing parameters per original or of reading the same original by plural times by changing the processing parameters and the originals had to be replaced manually one by one.

In view of the late circumstances that the use of the image inputting apparatus on a network has become common and an amount of originals to be read has increased remarkably, such conventional image inputting apparatus has been problematic in terms of productivity.

Further, while there has been an image inputting apparatus supporting a function of reading originals on the original feeder by feeding them to a platen one by one, not reading them all continuously, the original is fed in connection with a reading process and the next original is fed automatically when the original on the platen is read because the conventional image inputting apparatus has been configured to feed the original as its image is read corresponding to an image reading command from an external control unit and the image reading operation cannot be separated from the original feeding operation. Accordingly, it has had a problem that the same original cannot be read repeatedly by a desired number of times in using the original feeder.

There has been an image inputting apparatus disclosed in Japanese Patent Laid-Open No. Hei. 9-102853 for example as a concrete example of the conventional image inputting apparatus fitted with an original feeder. This apparatus pre-scans all originals set on the original feeder continuously and displays the result of the pre-scan on a screen. Then, when the user selects a desirable page in the display of the result of the pre-scan upon setting the same original on the original feeder again, the apparatus simply feeds pages other than the selected page without reading them and reads only the selected page at high-resolution. However, this apparatus has required all of the originals to be set again on the original feeder after the pre-scan to carry out the main scan and has been inconvenient to use from a remote place. This apparatus has not been also supposed to read the same page plural times by changing processing parameters and others by utilizing the original feeder.

There has been also an apparatus disclosed in Japanese Patent Laid-Open No. 61-23163 as another example. This apparatus has been able to read only an original to be inputted which is specified by its page No. from the outside and to maintain the original page order even after ending the reading. However, this apparatus has required to examine the originals in advance to find the location of the intended original. This apparatus has not been also supposed to read the same page set on the original feeder plural times.

SUMMARY OF THE INVENTION

To solve the above-mentioned problems, the present invention provides an image inputting apparatus which is capable of controlling the operation for feeding originals on the original feeder freely through the manipulation from an external control unit without manually replacing or resetting the originals at the site of the image inputting apparatus when the series of originals are set once in the original feeder and of executing various processes of reading the originals while changing processing parameters per page, of reading the same page by any number of times while changing the processing parameters or of skipping pages which need not be read.

According to an aspect of the present invention, the image inputting apparatus has an image reading section that optically reads originals, and an original feeder section that automatically feeds the originals to the image reading section. The apparatus also has a control section that receives a command for the image reading section and a command for the original feeder section and controls the image reading section and the original feeder section independently from each other in response to the received command.

This configuration allows the image reading section and the original feeder section to be controlled independently even when the originals are placed on the original feeder section and the feeding process may not be implemented necessarily together with the reading process like case of the past. Therefore, it enables to feed the originals on the original feeder section one by one to the image reading section and to read the same original repeatedly until when a satisfactory result can be obtained by the image reading section.

According to another aspect of the present invention, the image inputting apparatus has an image reading section that optically reads originals, and an original feeder section that feeds the originals to the image reading section, and an operation of the original feeder section is controlled according to an operation of the image reading section in response to a command for the image reading section. The apparatus also has a control section that independently controls the original feeder section when a command for the original feeder section is received.

This configuration also allows the original feeder section to be controlled independently from the image reading section, thus allowing various processes which could not be implemented in the past.

According to, still, another aspect of the present invention, the image inputting apparatus has an image reading section that optically reads originals, and an original feeder section that feeds the originals to the image reading section. In response to a command from the outside, the originals placed on the original feeder section are processed in one of three modes as follows: a continuous mode of continuously reading the originals placed on the original feeder section under the same processing parameter; an individual mode of reading the originals placed on the original feeder section by receiving a processing parameter for each original; and a feed mode of only feeding a specified number of originals placed on the original feeder section without implementing a reading process.

This configuration allows the degree of freedom of the processes on the originals placed on the original feeder section to be improved by combining the continuous mode, the individual mode and the feed mode.

According to still another aspect of the present invention, the image inputting apparatus may further have a temporary parameter holding section that receives and holds a designated value of each processing parameter applied to one original or more to be read in response to one reading command, and a job parameter holding section that receives and holds a designated value of each processing parameter applied to all of the originals placed on the original feeder section in principle. When the reading command is received, the control section refers to the temporary parameter holding section and the job parameter holding section, and controls the image reading section and the original feeder section by using the value held in the temporary parameter holding section for the processing parameter held in the temporary parameter holding section and by using the value held in the job parameter holding section for processing parameters other than that.

This mode enables to avoid cumbersome works of setting the processing parameters one by one for each original placed on the original feeder and to implement a special process in processing the original individually by special parameters by setting them as temporary parameters, by enabling to set the parameters related to the reading process hierarchically.

According to still another aspect, the image inputting apparatus may further have a displaying section that shows the image inputting apparatus is in use on a display of the image inputting apparatus or on an external unit when a processing request is made from the external unit.

This mode enables to suppress the image inputting apparatus in use from being interrupted or used by the others.

According to still another aspect, the image inputting apparatus may further have a limiting section that limits, when a processing request is made from an external unit, at least a part of the other processing request made from the other external units.

This mode enables to prevent the current job from being interrupted by limiting the control of the others to the image inputting apparatus in use.

The present invention also provides an image inputting system having an image inputting apparatus including an image reading section for reading images of originals, an original feeder section for automatically feeding the originals to the image reading section, and a control section, and an external control unit that requests the image inputting apparatus to implement an image reading process. The control section supports a command for operating the original feeder section and a command for operating the image reading section as a command interface to the external control unit, and operates the original feeder section and the image reading section independently from each other in response to the command from the external control unit.

This system allows the image reading section and the original feeder section to be controlled independently from each other even when the originals are placed on the original feeder section, the originals on the original feeder section to be fed to the image reading section one by one and the same original to be read repeatedly until when a satisfactory result can be obtained by the image reading section.

BRIEF DESCRIPTION OF THE DRAWINGS

A preferred embodiment of the present invention will be described in detail based on the drawings:

FIG. 6 is a chart showing examples of commands and responses defined between the image inputting apparatus and the external control unit;

DESCRIPTION OF THE PREFERRED EMBODIMENT

Figure 1:
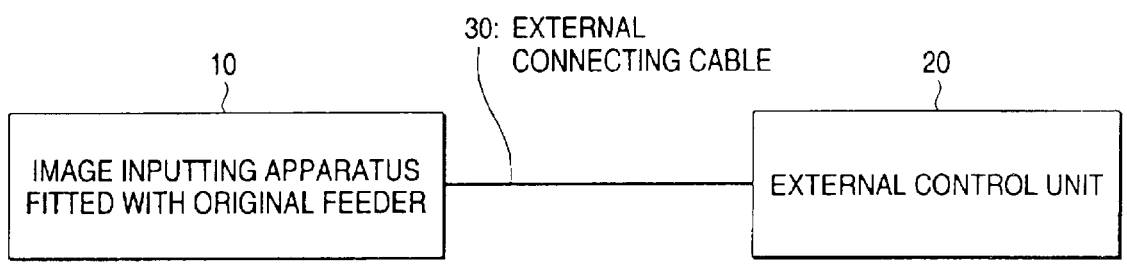
FIG. 1 is a diagram showing a structural example of an image input system comprising an inventive image inputting apparatus fitted with an original feeder.

FIG. 1 is a diagram showing a structural example of an image input system comprising an inventive image inputting apparatus fitted with an original feeder. The image inputting apparatus fitted with the original feeder (hereinafter abbreviated as the image inputting apparatus) 10 is a scanner or a digital complex apparatus for example and is fitted with an original feeder (ADF or DADF (double-side ADF). An external control unit 20 is a client unit such as a personal computer and a workstation which requests the image inputting apparatus 10 to perform a process for reading an image of an original and which is connected with the image inputting apparatus 10 via an external connection cable 30 such as an SCSI cable. It is noted that the external control unit 20 may be connected with the image inputting apparatus 10 via a network such as a local area network and INTERNET.

Figure 2:
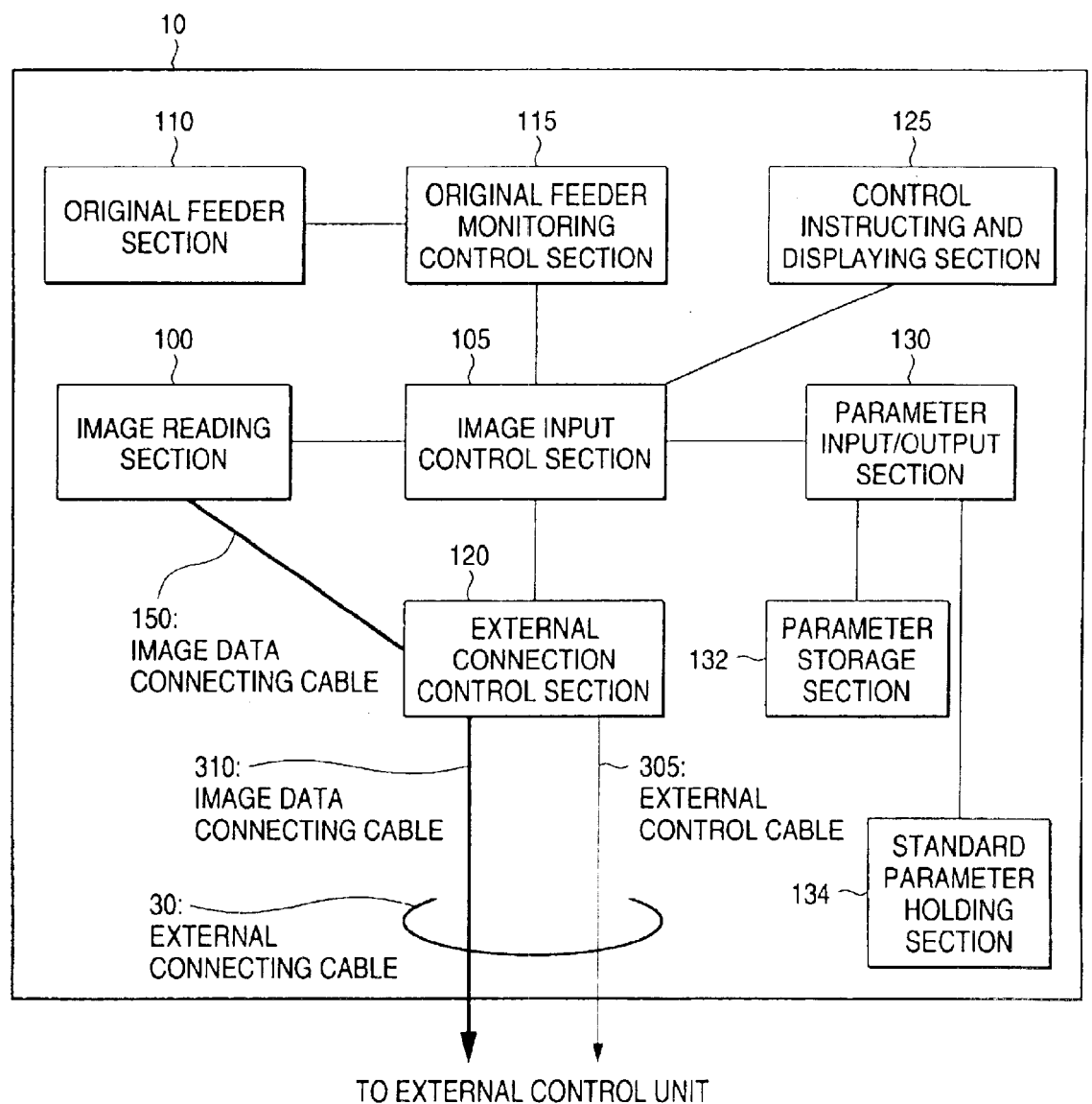
FIG. 2 is a diagram showing the internal structure of the image inputting apparatus.

FIG. 2 is a diagram showing the internal structure of the image inputting apparatus 10. In FIG. 2, an image reader section 100 is a unit for optically reading the original to generate digital data of the image of the original and typically comprises a platen (original table) for placing the original, a light source for illuminating the original, an image sensor such as a CCD line sensor for reading the image of the original and a scan mechanism for scanning the light source and the image sensor relatively to the original. An image input control section 105 mainly controls the image reading section 100 as well as each device of the image inputting apparatus 10 as a whole. An original feeder section 110 is a unit for automatically feeding the original to the image reading section 100 and typically comprises a tray for stacking the originals and a carrier mechanism for taking out the originals on the tray one by one to transport onto the platen of the image reading section 100. An original feeder monitoring control section 115 is a unit for monitoring and controlling the states of the original feeder section 110.

The external connection control section 120 is a unit for controlling communications with the external control unit 20 connected via the external connecting cable 30. Here, the external connecting cable 30 comprises an external control cable 305 used for transmitting control data and an image data connecting cable 310 used for transmitting image data. The external connection control section 120 receives control commands and others from the external control unit 20 to pass them to the image input control section 105 and transmits the response of the image input control section 105 to that command, various status information of the image inputting apparatus 10 and the like to the external control unit 20. The external connection control section 120 also receives resultant image data of the read original outputted from the image reading section 100 via an image data connecting cable 150 and transmits it to the external control unit 20 via the image data connecting cable 310 under the control of the image input control section 105.

A control instructing and displaying section 125 is a user interface of the image inputting apparatus 10 and typically comprises a control panel for inputting commands such as Scan (Read) and processing parameters such as one-side/double-side scan and a display section such as a liquid crystal display for displaying the states of the image inputting apparatus 10 and information for inputting the commands. It is also possible to utilize a unit such as a touch panel in which the control panel is combined with the display section.

A parameter input/output section 130 is a unit for storing various processing parameters specified in connection with Scan Job (a series of reading processes) from the external control unit 20 in a parameter storage section 132 and for reading the various processing parameters in operating the image reading section 100 and the original feeder section 110 from the parameter storage section 132 and a standard parameter holding section 134. The processing parameters include various parameters related to information for specifying an area, resolution and color of an object to be read, to density and the like. The apparatus of the embodiment is arranged such that these various processing parameters can be specified not only in unit of job but also per page within the job or per series of page groups to be continuously printed. The former will be called as a job parameter and the latter will be called as a temporary parameter hereinbelow. The job parameter and the temporary parameter may be specified from the control instructing and displaying section 125 or from the external control unit 20 and the contents of the specification is held by the parameter input/output section 130 in the parameter storage section 132 under the control of the image input control section 105. The parameter storage section 132 is constructed on a main memory for example. The standard parameter holding section 134 is a unit for storing default values of the various processing parameters and is composed of an ROM or a rewritable ROM for example. Thus, there exist three layers of the temporary parameter, job parameter and standard parameter which is the default value within the processing parameters and the priority is given in this order.

Figure 4:
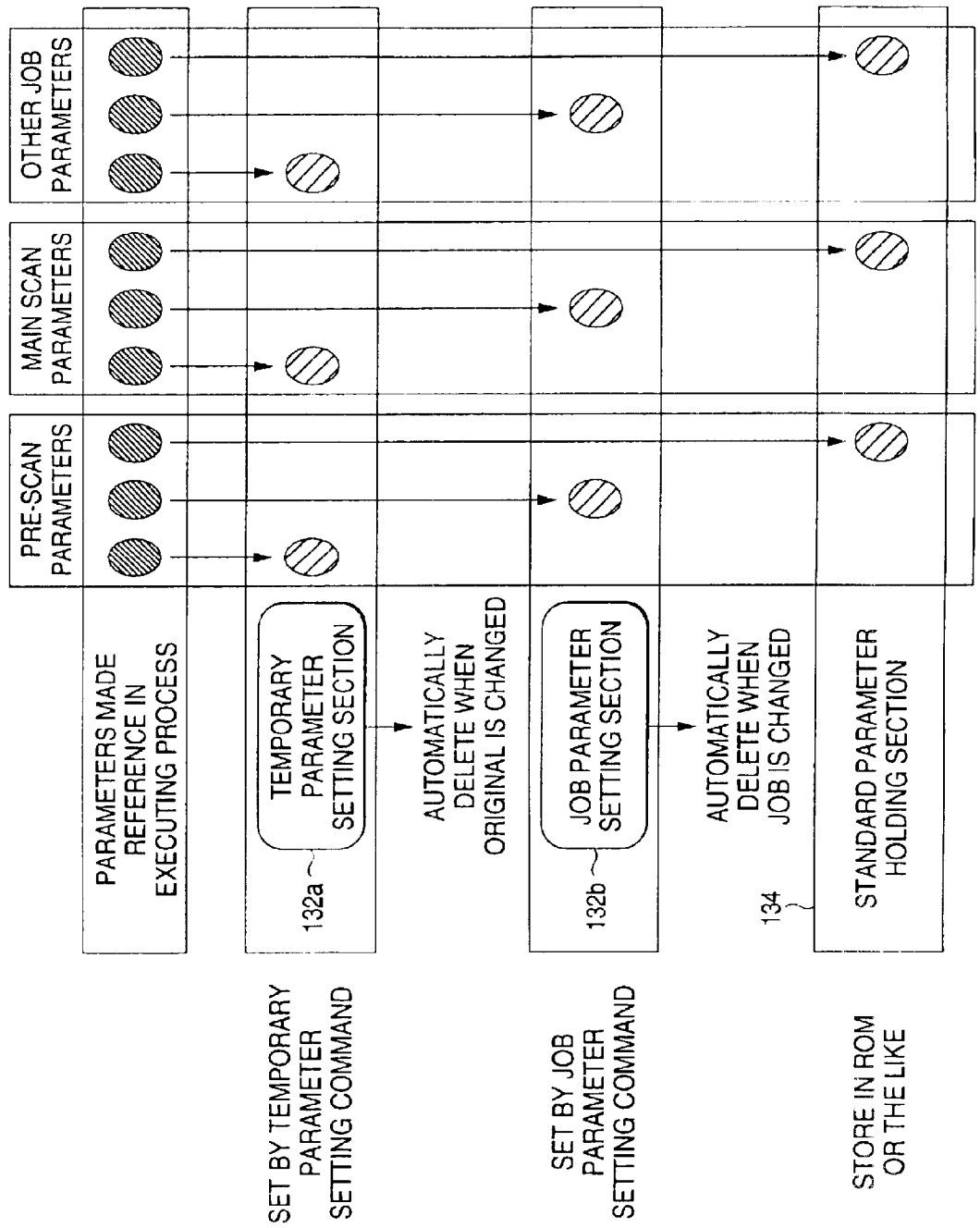
FIG. 4 is a chart for explaining the management of parameters in the system according to an embodiment of the invention.

FIG. 4 is a chart showing the outline of the management of parameters in the system of the embodiment. As shown in the figure, the apparatus of the embodiment allows processing parameters for pre-scan and processing parameters for main scan to be set separately. These parameters are related mainly to reading of the image such as an area, density and tint of the object to be read. These parameters also include parameters other than those related to reading of the image. For instance, while the apparatus of the embodiment provides functions of displaying a message indicating that the image inputting apparatus 10 is presently in use to give a caution to other persons and of prohibiting interruption from the other during the scan job, whether or not to utilize such function is one of important parameters related to the job. "Other Parameters" in FIG. 4 include such parameters. While the apparatus of the embodiment is arranged so as to allow an operator to specify a process of simply feeding an original without reading the original from the control instructing and displaying section 125 or the external control unit 20, various parameters, e.g., a number of originals to be fed in response to one time of command of Feed, related to such pure feeding process are also included in the "Other Parameters". Upon specifying that a process to be carried out from now on is which of the pre-scan, main scan or others, the image input control section 105 requests the parameter input/output section 130 to obtain the necessary processing parameters. Upon receiving such request, the parameter input/output section 130 obtains the necessary processing parameters from the parameter storage section 132 and the standard parameter holding section 134 corresponding to the contents of each process. Here, among the various processing parameters, the temporary parameter is adopted prior to the job parameter and standard parameter for the process for which the temporary parameter is preset, the job parameter is adopted for the process for which the job parameter is preset and the temporary parameter is not preset and the standard parameter is adopted for the process for which neither of the temporary parameter and job parameter is preset. That is, the parameter input/output section 130 makes reference to a temporary parameter setting section 132a of the parameter storage section 132 at first to obtain a value of a processing parameter, obtains a preset value from a job parameter setting section 132b for a processing parameter which could not be obtained from the temporary parameter setting section 132a and obtains a default value from the standard parameter holding section 134 for a processing parameter which could not be obtained also from the job parameter setting section 132b. Then, a set of the processing parameters thus obtained is handed to the image input control section 105. It is noted that the respective preset values of the temporary parameter setting section 132a are automatically deleted when a series of original processes corresponding to the group of the preset values is completed. The respective preset values of the job parameter setting section 132b are also automatically deleted when the pertinent scan job is completed.

Thus, the adoption of the hierarchical parameter setting of the job parameter applied to the whole job in principle and of the temporary parameter applied in priority over the job parameter only in the scope specified within the job allows an necessary part to be processed while changing the parameters individually, not uniformly processing all originals simply by the same parameter, while avoiding the cumbersome works of setting processing parameters per page in reading a large volume of originals.

Figure 3:
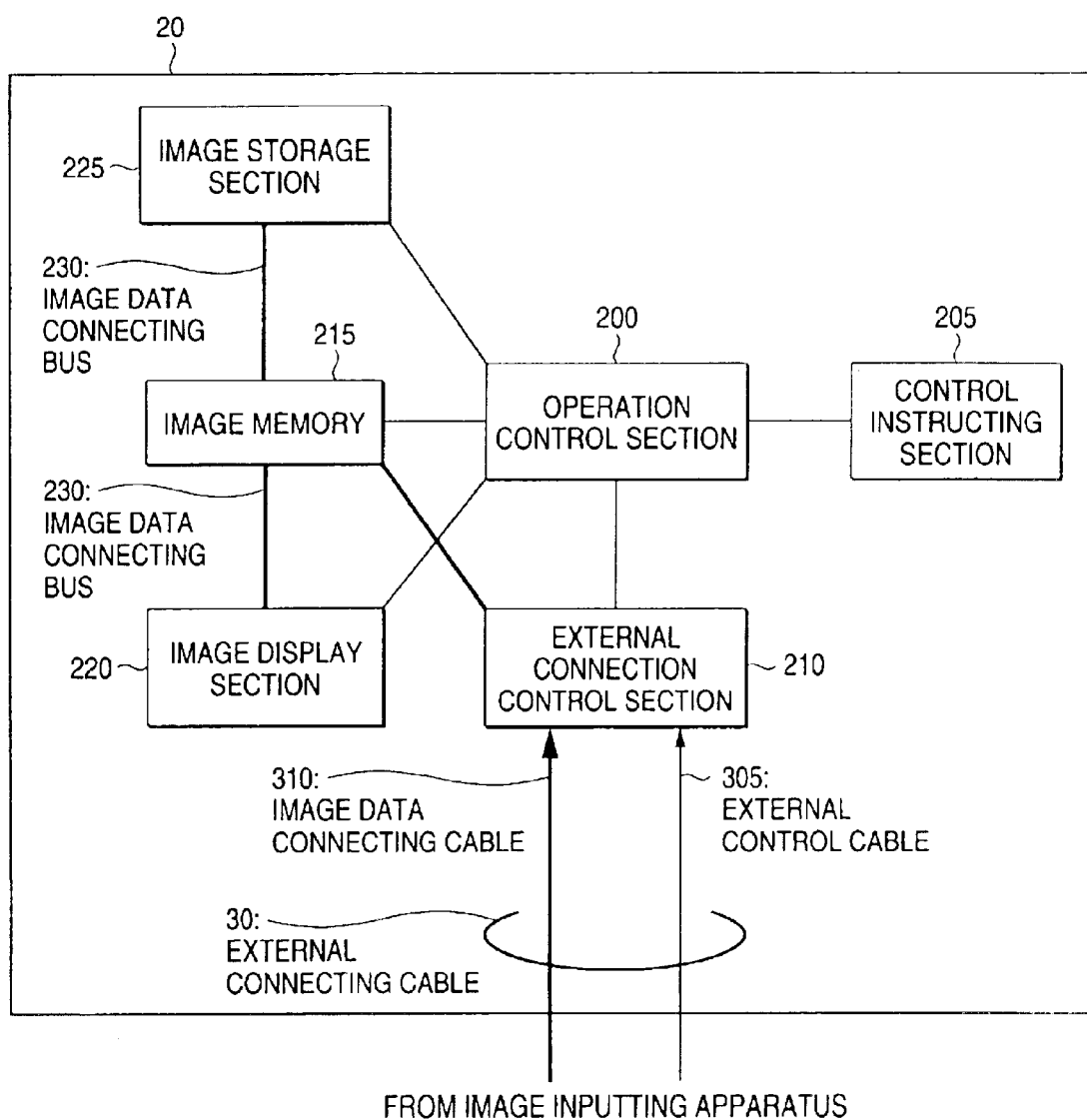
FIG. 3 is a diagram showing the Internal structure of an external control unit.

FIG. 3 is a diagram showing the internal structure of the external control device 20. The external control unit 20 is a DTP system having a scanner interface for example and is constructed on a platform of a personal computer, a workstation and the like. An operation control section 200 is a main control section of the external control unit 20 and is typically constructed by software as part of a DTP application. A control instructing section 205 is a user interface for obtaining instructions from a user and is constructed by using a dialog box (window) utilizing GUI (graphical user interface) technology and an input device such as a keyboard and mouse. An external connection control section 210 is a unit for making communications with the image inputting apparatus 10 via the external connecting cable 30. The external connection control section 210 transmits control command and the like issued by the operation control section 200 in response to an input from the control instructing section 205 to the image inputting apparatus 10 via the external control cable 305 and receives a response from the image inputting apparatus 10 for that command to pass it to the operation control section 200. The external connection control section 210 also receives data of the image of the original read by the image inputting apparatus 10 via the image data connecting cable 310 and stores it in an image memory 215 via an image data connecting bus 230. The image memory 215 is a fast memory for holding image data and is typically a semiconductor memory. In response to the instruction of the user, the operation control section 200 issues a command such as Read Image to the image inputting apparatus 10 and stores a resultant read image sent from the image inputting apparatus 10 in response to that once in the image memory 215. It then displays on an image display section 220 or files in an image storage section 225 such as a hard disk unit for example in response to the instruction of the user.

In the system constructed as described above, according to the embodiment, there is provided a command for directly controlling the original feeder section 110 in the image inputting apparatus 10 as a command (program) interface to the external control unit 20. That is, while no command for directly controlling only the original feeder section 110 has been provided in the conventional image inputting apparatus and the original feeder section 110 has been operated in connection with the operation of the image reading section 100, the original feeder section 110 is operated independently from the image reading section 100 and a direct control command for performing only Feed Original is provided in the system of the embodiment. This command will be called as a feed command. The use of this feed command allows the apparatus to skip originals which need not be read. Although a processing time has increased because all originals including unnecessary originals placed on the original feeder section 110 have been read (it is problematic remarkably in reading at high-resolution) in the conventional image inputting apparatus and it has required cumbersome works of taking out the unnecessary originals manually in advance to avoid such problem, a processing time may be shortened without carrying out such cumbersome works by the apparatus of the embodiment because the unnecessary originals may be fed in blank by utilizing the feed command by confirming it by a pre-scan image on the user interface screen on the external control unit when it is found as a result that the very page needs not be read (not to perform Main Scan). The apparatus of the embodiment is also provided with a command for operating the image reading section 100 independently from the original feeder section 110. This command is a command for instructing to perform only the process for reading the original on the platen without performing Feed Original and is called as a platen input command. This command allows an original placed on the platen at that time to be read without feeding originals even when the originals are placed on the original feeder section 110. That is, it allows the same page on the platen to be read many times even when the originals are placed on the original feeder section 110. This function has not been provided in the past.

Therefore, according to the embodiment, the image input control section 105 discriminates whether the command is issued by the external control unit 20 to the original feeder section 110 or to the image reading section 100. It then controls the image reading section 100 based on that command when the command is issued to the image reading section 100 and passes the command to the original feeder monitoring control section 115 when the command is issued to the original feeder section 110. It is noted that a command of "feed original to read" for example for instructing the original feeder section 110 and the image reading section 100 to operate cooperatively may be used also in the apparatus of the embodiment in the same manner with the conventional apparatus. When the command inputted from the external control unit 20 is such command, the image input control section 105 generates a command for instructing an original feeding operation necessary for processing such command and passes it to the original feeder monitoring control section 115 to operate the image reading section 100 cooperatively with the original feeder monitoring control section 115.

Thus, according to the embodiment, it has become possible to control only the image reading section 100 from the external control unit 20 or to control only the original feeder section 110 by providing the command interface for controlling the image reading section 100 and the original feeder section 110 independently from each other in the image inputting apparatus 10. It has also become possible to provide various processes which could not be provided by the conventional image inputting apparatus by combining the operation control of the original feeder section 110 and the operation control of the image reading section 100. The contents of the processes which can be provided will be described later in detail.

Figure 5:
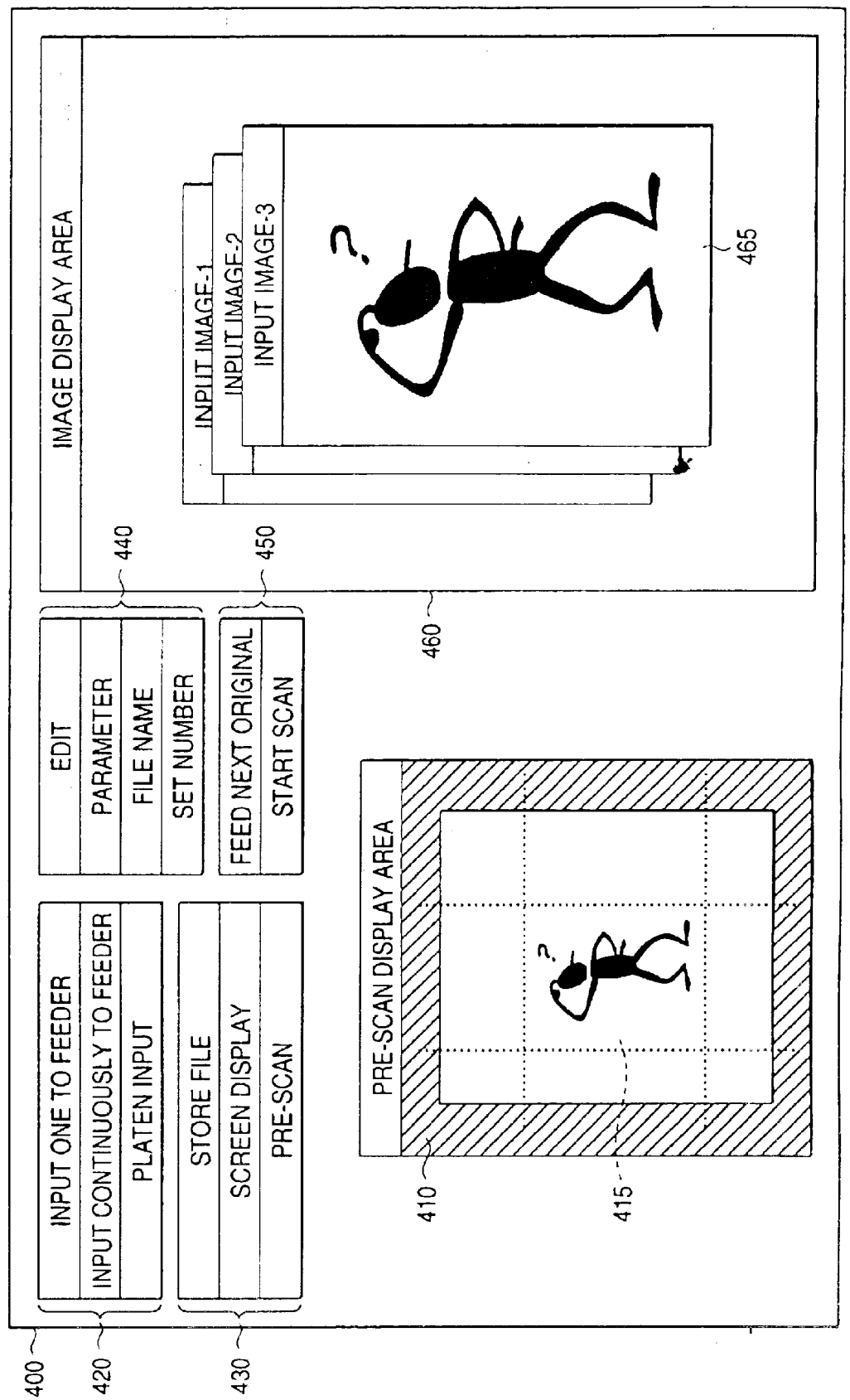
FIG. 5 shows one example of a user interface screen for an image reading process utilizing the image inputting apparatus in the external control unit.

FIG. 5 shows one example of a user interface screen 400 for an image reading process utilizing the image inputting apparatus 10 in the external control unit 20. The user interface screen 400 has two image display areas of a pre-scan display area 410 for displaying a low-resolution image obtained by pre-scan and an image display area 460 for displaying a high-resolution image obtained by main scan as well as a display area of various buttons for inputting control commands.

Here, a reading mode instructing toggle section 420 is a toggle for setting a mode of the reading process. The embodiment provides three modes of "Input One to Feeder", "Continuously Input to Feeder" and "Platen Input". Only one mode among them is always selected and only the selected mode becomes valid. "Input One to Feeder" is a mode for feeding and reading one original on the original feeder section 110 and "Continuously Input to Feeder" is a mode for continuously reading originals on the original feeder section 110 only by a specified number of originals. "Platen Input" is a mode for reading originals on the platen without original feeding. The original is left on the platen as it is even after the reading in the "Platen Input" mode.

A reading purpose instructing toggle section 430 is a toggle for instructing the purpose of use of image data obtained by the reading process. The embodiment provides three modes of "Store File", "Screen Display" and "Pre-Scan". Only one mode among them is always selected and only the selected mode becomes valid. "Store File" and "Screen Display" among them are related to image data obtained by the high-resolution (e.g., 300 dpi) main scan process. "Store File" is a mode for filing an obtained image automatically in the image storage section 225 without displaying it and "Screen Display" is a mode for displaying the obtained image once on the screen of the image display section 220 (image display area 460) to ask the user to instruct a process thereafter (e.g., filing, editing and the like). "Pre-Scan" is a mode for reading a rough image of the original (e.g., 72 dpi) used in specifying an area to be read and parameters such as density and tint in performing the main scan. The image read in this mode is displayed on the pre-scan display area 410. The scope of the area to be read 415 may be specified in the image of the original on the pre-scan display area 410.

Control instructing buttons for instructing a process to be implemented on the image and for setting processing parameters are included in a process setting button section 440. A sub-menu for instructing a control and for inputting the processing parameters corresponding to the respective control is displayed by clicking the respective button by a mouse or the like and various settings are made on this sub-menu. "Edit" button is a button for calling out a sub-menu for instructing an editing operation on the resultant inputted image of the main scan (displayed on the image display area 460) and allows the user to instruct various image processing such as Cutting-Out of part of the image. Turn, Magnify/Reduction, Resolution Change and Color Space Change on the sub-menu. "Parameter" button is a button for calling a sub-menu for setting various processing parameters and allows various processing parameters such as Paper Size, Area to be Read (such as reading starting coordinates, area size), Color Space, Number of Colors, Resolution, Magnifying/Reducing Factor, Turn/No Turn and its Direction, Tint, Sharpness, Density, Hue, Color Balance, Automatic Gradation Correction/No Correction and Automatic Contrast Correction/No Correction to be set on the sub-menu. It is noted that the sub-menu related to "Parameter" is arranged so as to select one parameter among the pre-scan parameter, main scan parameter and other parameter for example and to select either the job parameter or the temporary parameter to be able to set parameters corresponding to the selected cases, e.g., "temporary parameter in the main scan" and "job parameter in the main scan". "File Name" button is a button for calling out a sub-menu for setting a file name in storing the read image in a file and a rule in naming a file name. "Set Number" button is a button for calling out a sub-menu for setting a number of originals continuously read or fed at a time in the reading process in the above-mentioned "Feeder Continuous Input" mode and in an original no-load feeding process caused by "Feed Next Original" button.

There are two buttons for instructing operations of the image inputting apparatus 10 in an operation instructing button section 450. When "Start Scan" button is clicked by the mouse, the operation control section 200 issues a reading instructing command. The modes selected in the reading mode instructing toggle section 420 and the reading purpose instructing toggle section 430 and the various processing parameters set by utilizing the various buttons in the process setting button section 440 are appended to this command. It is noted that the default time value stored in the standard parameter holding section 134 is adopted for the parameters other than the modes when the user does not sets. When the user clicks "Start Scan" button upon selecting the modes and processing parameters, the image inputting apparatus 10 executes the reading process in accordance to the selected modes and processing parameters. When the user clicks the other button, i.e., "Feed Next Original" button, by the mouse, the operation control section 200 issues an original feeding command. The information on a number of originals to be fed set by using the "Set Number" button is appended to this command as a processing parameter. When no number of originals to be fed is set, the default time value, e.g., one, stored in the standard parameter holding section 134 is adopted. Receiving this original feeding command, the image inputting apparatus 10 causes the original feeder section 110 to start while stopping the image reading section 100 to feed the data only by the specified number of originals to be fed.

Next, the commands and the responses defined between the image inputting apparatus 10 and the external control unit 20 will be explained with reference to FIG. 6. As shown in the figure, a command No. is assigned to each command and response as an identification number. The commands and responses are exchanged between the image inputting apparatus 10 and the external control unit 20 by using the command Nos. For instance, Command No. 00 and Command No. FF are responses for notifying the completion of a process from the image inputting apparatus 10 to the external control unit 20. The other commands are commands for instructing operations from the external control unit 20 to the image inputting apparatus 10. Processing parameters may be set by some commands. A parameter No. is assigned to each parameter as an identification No. to discriminate the type of the parameters by the parameter No. In the example of the figure, the respective parameter Nos. are set uniquely among the processing parameters of the same command. For instance, various parameters such as the type of the scanning process, the paper size, the color-related parameters and the area to be read are defined in the setting commands of the job parameter and temporary parameter of Command Nos. 10 and 20. Number of originals to be fed is defined as a parameter in Feed Processing command of Command No. 50.

Figure 7:
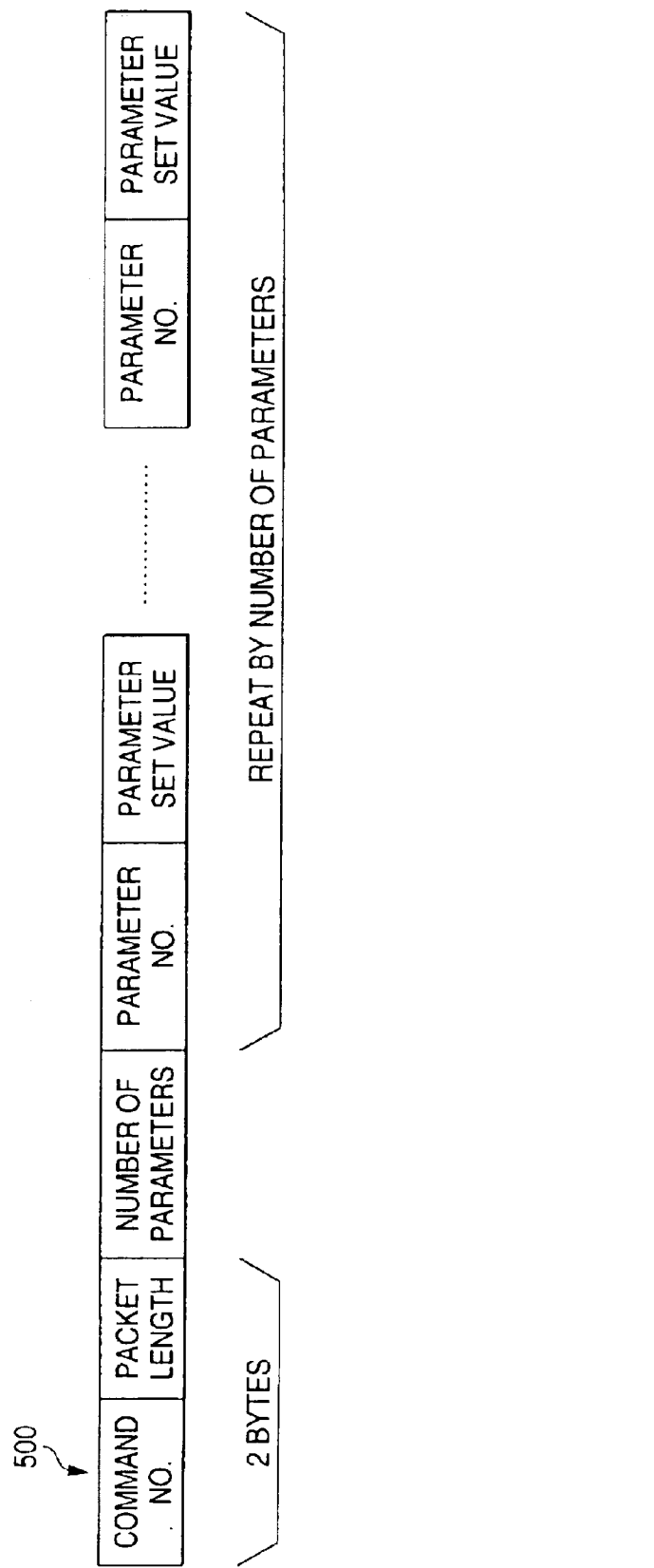
FIG. 7 shows an example of the data structure of a command response packet.

A command/response packet 500 as shown in FIG. 7 is used in making communications the commands/responses between the external control unit 20 and the image inputting apparatus 10. In the example shown in the figure, the command/response packet 500 starts with a field of "Command No." indicating the type of the command/response which is then followed by "Packet Length" and "Number of Parameters". After that, information on each parameter set for the command (or the response), i.e., the set of the "Parameter No." and its "Set Value", is repeated by the "Number of Parameters". The external control unit 20 and the image inputting apparatus 10 form such command/response packet 500 every time when they try to issue the command/response and transmit to their partner. Such packet 500 is formed and is transmitted to the image inputting apparatus 10 every time when the buttons of "Start Scan" and "Feed Next Original" are clicked or when the setting operation is completed in the sub-menu of "(Set) Parameter" and "Set Number" in the user interface screen 400 in FIG. 5. The image inputting apparatus 10 forms the packet 500 for notifying the completion of a process and transmits it to the external control unit 20 every time when the process responding to the command from the external control unit 20 is completed.

Next, the processing procedure in the embodiment will be explained with reference to FIGS. 8 through 15.

Stage 1

Figure 8:
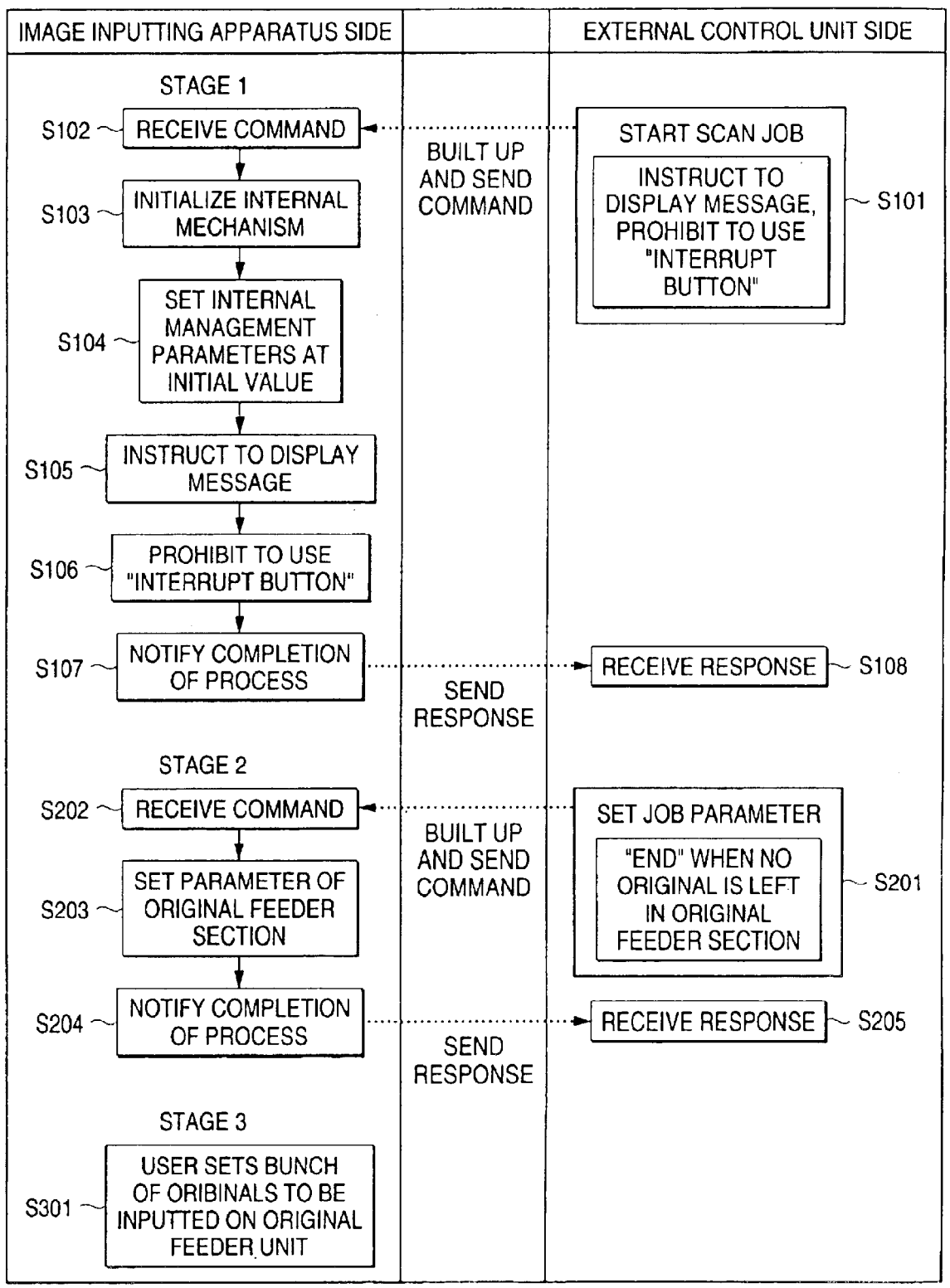
FIG. 8 shows the processing procedure of the system according to the embodiment of the invention.

When the user wants to digitize images of a series of originals, the user implements the process of Stage 1 shown in FIG. 8 at first. That is, the user instructs the image inputting apparatus 10 to start a scan job from the user interface of the external control unit 20 at first (S101). Although not shown in FIG. 5, it is possible to provide a button for managing jobs on the user interface screen 400 so as to be able to open a job management dialog and to instruct to generate or end a job by using the button. It is also possible to set the apparatus so that it interprets the completion of process of a bunch of originals stacked on the original feeder section 110 as one job without specifically giving any instruction. "Generate", "Continue" (in case of adding originals when no original is left in a tray of the original feeder section) and "End" may be instructed from this dialog. Here, "generate" is selected. When it is controlled from the external control unit 20 at a remote place at this time, it is possible to arrange the apparatus so as to indicate that the image inputting apparatus 10 is in use on the control instructing and displaying section 125 of the image inputting apparatus 10 or to put the control buttons such as "Interrupt" on the image inputting apparatus 10 into a use prohibited state for the other external control unit which transmits a scan job as necessary. The instruction for dealing with the process related to the control from the others as described above may be set in the image inputting apparatus 10 as one of processing parameters of the scan job starting command (see the item of Command No. 01 in FIG. 6). In this case, the apparatus is arranged so that the parameter for dealing with such control of the other may be specified as an option in issuing the scan job starting command and is sent to the image inputting apparatus 10 together with the scan job starting command. It is noted that the apparatus may be arranged such that such parameter for dealing with the control of the other may be set in the latter stage by utilizing "Parameter" setting command (see the process setting button section 440 in FIG. 5).

Receiving the scan job starting command (S102), the image inputting apparatus 10 initializes the internal structure such as the various processing parameters (S103) and sets initial values for the internal management parameters (S104). Then, it instructs to display a message indicating that it is in use (S105) or prohibits to use the interrupt button (S106) as necessary in accordance to the values of the parameters appended to the command. When the series of these processes ends, the image inputting apparatus 10 generates a packet notifying that the process is completed and transmits it to the external control unit 20 as a response to the command (S107). When the external control unit 20 receives this response (S108), the process of this stage ends.

Stage 2

After starting the scan job in Stage 1, the user can set a process to be implemented from the external control unit 20 as necessary when the originals on the original feeder section 110 are all fed. The processes to be implemented in this case include processes of simply "ending" and of "asking the user to judge whether or not a message is to be displayed on the external control unit 20 to continue" when the originals have been all fed. This setting may be carried out by using the parameter setting command (see FIG. 5). That is, when the user sets this parameter by using "Parameter" setting button on the user interface screen 400 of the external control unit 20 (S201), the value of that parameter is transmitted together with the parameter setting command to the image inputting apparatus 10. Receiving them, the image inputting apparatus 10 sets this value as one processing parameters of the original feeder section 110 (S203) and creates a response of notifying that the process is completed to return to the external control unit 20 (S204). The process of this stage ends when the external control unit 20 receives this response (S205). It is noted that although the case of implementing the process of Stage 2 right after the process of Stage 1 has been explained here, basically the process of Stage 2 may be implemented not only right after the process of Stage 1 but also at a desired point of time thereafter.

Stage 3

Figure 9:
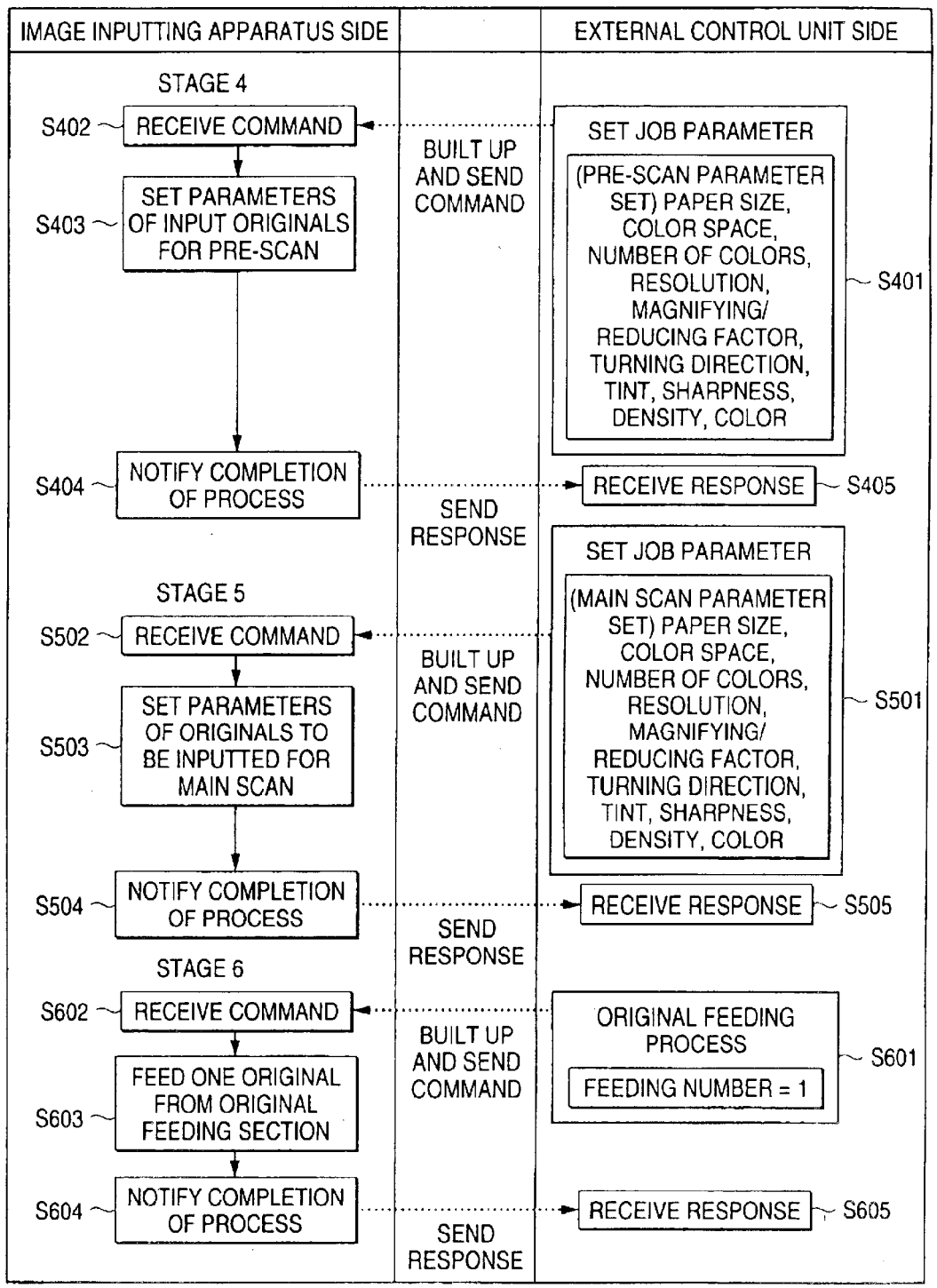
FIG. 9 shows the processing procedure of the system according to the embodiment of the invention.

When the scan job starting process in Stage 1 is completed, a bunch of originals to be inputted is set on the original feeder section 110 as shown in FIG. 9 (S301). When the image inputting apparatus 10 is located at a remote place from the position of external control unit 20 where the user is present and the user cannot set the originals, the bunch of the originals to be inputted may be set on the original feeder section 110 by a person who is present near the image inputting apparatus 10 by asking to do so through a phone call or the like.

Stage 4

After setting the originals (Stage 3), job parameters for the pre-scan process may be set from the external control unit 20 as the process of Stage 4 as necessary. While the embodiment allows the user to instruct the pre-scan in free unit such as per page for example from the external control unit 20 until the scan job ends, the default pre-scan processing parameters common to the all pages until the end of the scan job are set here (it is needless to say that the values in the standard parameter holding section 134 are made reference for parameters not set here). In this stage, the user specifies parameters such as the size and direction of a paper inputted for pre-scan, density, tint and others as job parameters by selecting the "Parameter" button on the user interface screen 400 of the external control unit 20 at first (S401). Receiving the parameter set values (S402), the image inputting apparatus 10 sets them in the temporary parameter setting section 132a of the parameter storage section 132 as the pre-scan job parameters (S403) and returns a response of notification of completion of process to the external control unit 20 (S404). When the external control unit 20 receives this response (S405), the process of this stage ends.

Stage 5

The main scan job parameters may be also set as necessary in Stage 5. This setting process is similar to that of Stage 4. When the user sets the job parameters from the user interface screen 400 of the external control unit 20 (S501), parameter set commands are sent to the image inputting apparatus 10. Receiving those parameter set values (S502), the image inputting apparatus 10 sets them in the job parameter setting section 132b (S503) and generates a response of notification of completion of process to notify that to the external control unit 20 (S504). When the external control unit 20 receives this response (S505), the process of this stage ends. It is noted that the default time values stored in the standard parameter holding section 134 are made reference for parameters not set in this process (limited to those not set also in the temporary parameter setting process described later).

Stage 6

When the processes in Stages 1 and 3 are completed, it becomes possible to execute the scanning (reading) process (Stages 2, 4 and 5 are options). The image inputting apparatus 10 may be utilized by specifying various modes by the reading mode instructing toggle section 420 and the reading purpose instructing toggle section 430 (see FIG. 5) hereinafter. A case of instructing the original feeding and reading processes individually by utilizing the "Platen Input" mode and the "Feed Next Original" button (see FIG. 5) will be explained below as one example.

In this case, only one original is fed on the platen of the original feeder section 110 by instructing from the external control unit 20 to read the first page as Stage 6. That is, when the user selects the "Feed Next Original" button on the user interface screen 400 of the external control unit 20, the external control unit 20 generates a feed processing command (Command No. 50, see FIG. 6) corresponding to that input (S601). It is possible to arrange so as to ask the user to input a number of originals to be fed and to add a value of that number inputted corresponding to that to that command as a parameter. Suppose that one is set as the feeding number in this case. Receiving that command (S602), the image input control section 105 in the image inputting apparatus 10 recognizes that command as a control command of the original feeder section 110 and instructs the original feeder monitoring control section 115 to feed only one original. In response to that, the original feeder monitoring control section 115 feeds only one original on the tray to the original feeder section 110 (S603). When the feed is completed, that effect is notified to the image input control section 105. In response to that, the image input control section 105 generates a response of notification of completion of process to be transmitted to the external control unit 20 (S604). When the external control unit 20 receives this response, the process of this stage ends (S605).

It is noted that as for a number of originals to be fed in clicking the "Feed Next Original" button, it is possible to set as "one" as a default value in the standard parameter holding section 134. In this case, it is possible to omit the feeding number setting operation in case of feeding only one original, i.e., the case which is considered to happen most.

Stage 7

When the original to be processed comes on the platen by the process of Stage 6, typically the pre-scan process of the original is implemented. The pre-scan is implemented mainly to specify an area to be scanned mainly (area to be read) within the original.

Figure 10:
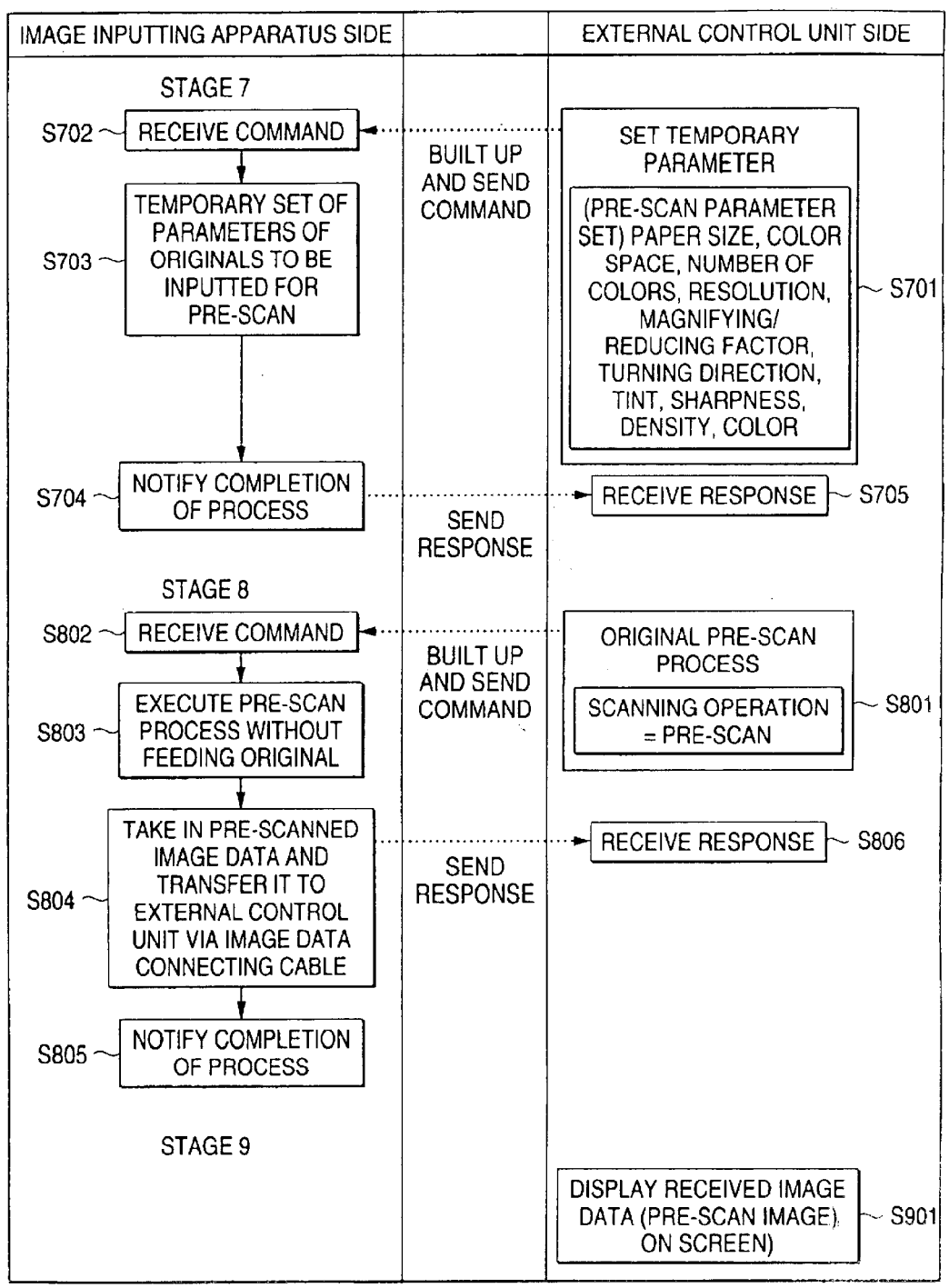
FIG. 10 shows the processing procedure of the system according to the embodiment of the invention.

In Stage 7 shown in FIG. 10, temporary parameters related to the pre-scan of the original on the platen are set. The job parameters commonly applied to the whole job have been already set in Stage 4. In this stage, the user sets the temporary parameters for the pre-scan by using the user interface screen 400 of the external control unit 20 at first (S701) to issue a parameter setting command. Receiving the command (S702), the image inputting apparatus 10 sets the values of the parameters sent together with the command in the temporary parameter setting section 132a of the parameter storage section 132 (S703) and returns a notification of completion of process to the external control unit 20 (S704). When the external control unit 20 receives this notification, the process of this stage ends (S705).

It is noted that the process of this stage is not necessary when the parameters set for the job parameters may be used as they are. It is also possible to arrange so as to be able to instruct to continuously utilize the temporary parameters set this time also in and after the next original (page).

Stage 8

When the user selects "Platen Input" mode and the "pre-scan" mode and clicks "Start Scan" button on the user interface screen 400 (FIG. 5) of the external control unit 20, the external control unit 20 generates a pre-scan processing command (Command No. 30, see FIG. 6) (S801) and transmits it to the image inputting apparatus 10. Receiving the command (S802), the image inputting apparatus 10 recognizes the specification of "Platen Input" and "Pre-Scan" and executes a scanning process (S803) by the pre-scan parameter (job parameter, temporary parameter and standard parameter. Typically by rough resolution of around 72 dpi and standard color tint) to the original on the platen by the image reading section 100 without feeding the original. The pre-scan is carried out to the whole area of the original in general. Then, the image inputting apparatus 10 transfers image data obtained by this pre-scan process to the external control unit 20 via the external connecting cable 30 (S804) and sends a notification of completion of process to the external control unit 20 when the transfer is completed (S805). When the external control unit 20 receives this notification (S806), the process of this stage ends.

Stage 9

Figure 11:
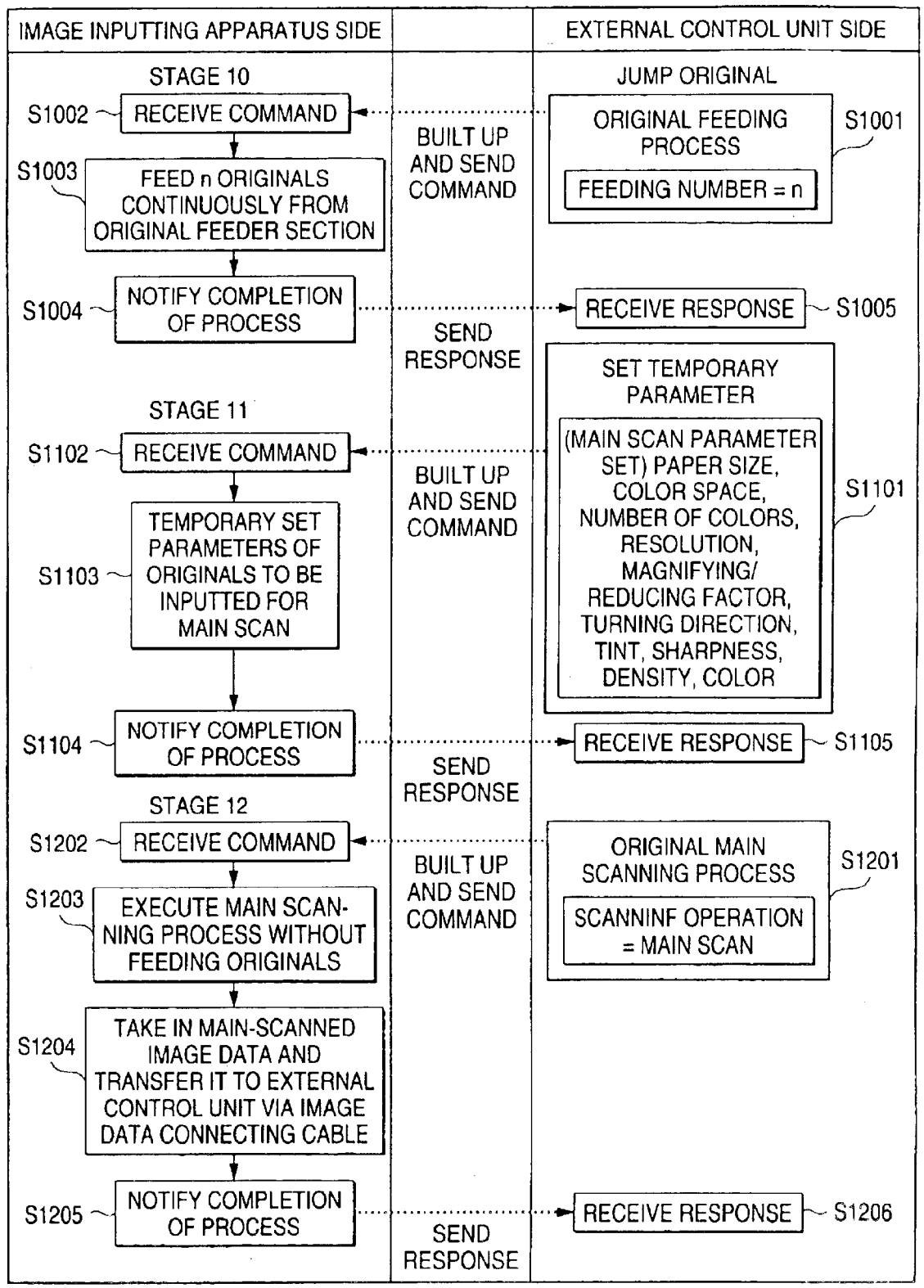
FIG. 11 shows the processing procedure of the system according to the embodiment of the invention.

The external control unit 20 which has received the resultant image of the pre-scan in Stage 8 displays the pre-scan image in the pre-scan display area 410 on the user interface screen 400 as a process of Stage 9 as shown in FIG. 11 (S901). By watching the screen display, the user confirms whether or not the original pre-scanned this time is desired one and advances the process to Stage 11 when the original is desired one after estimating the area to be read and tint roughly. Meanwhile, when the pre-scanned original is not desired one, the user advances the process to the next Stage 10 to replace originals.

Stage 10

When the user judges that the pre-scanned original is not what is intended in Stage 9, the next original is fed from the original feeder section 110 onto the platen in this stage. That is, when the user selects the "Feed Next original" button in the external control unit 20 (S1001) the image inputting apparatus 10 receives the command (S1002), implements the feeding process (S1003) and returns a notification of completion of process to the external control unit 20 (S1004). When the external control unit 20 receives this response, the process of this stage ends (S1005).

When the user can find the location of the desired original after some sheets of originals from the current original from page No. indicated on the confirmed image or from information of the image, the user can jump the originals on the way by clicking the "Feed Next Original" button after setting that number of sheets by the "Number Setting" button.

After ending the process of this stage, the processes of Stages 8 and 9 are executed and when the desired original is confirmed in Stage 9, the process advances to Stage 11.

Stage 11

After using the original on the platen as the desired one in Stage 9, the user sets the area to be main-scanned (area to be read) of that original in Stage 11. The user is allowed to set various parameters such as density and color related parameters as necessary at this time. These values are set as temporary parameters related to that original. The main purpose of this stage is the specification of the area to be read and the setting of the density, tint and the like is not mandatory. There is a chance for setting or correcting the density, tint and others afterward (Stage 15).

That is, the user calls out the setting sub-menu of "Temporary Parameter" for "Main Scan" by using the "Parameter" button in the external control unit 20 to set parameters. The area to be read 415 is specified on the pre-scan display area 410. The command/response packet 500 (temporary parameter setting command (Command No. 20)) is created from various input parameters including the area to be read by selecting the "Decide" button on the sub-menu and is sent to the image inputting apparatus 10 (S1101). Receiving the command (S1102), the image inputting apparatus 10 sets the parameters appended to that command in the temporary parameter setting section 132a (S1103) and returns a notification of completion of process to the external control unit 20 (S1104). When the external control unit 20 receives this response, the process of this stage is completed (S1105).

It is noted that the process of this stage is not necessary when the parameters set for the job parameters may be used as they are. It is also possible to arrange so as to be able to specify whether or not the temporary parameters set this time are continuously utilized for the next original and thereafter or to instruct to update the present job parameters to the temporary parameters set this time (that is, the values of those temporary parameters are set as the job parameters).

Stage 12

When the user selects the "Platen Input" mode and the "Main Scan" mode and clicks the "Start Scan" button on the user interface screen 400 of the external control unit 20, the external control unit 20 generates a main scan processing command (Command No. 40, see FIG. 6) (S1201) and transmits it to the image inputting apparatus 10. Receiving the command (S1202), the image inputting apparatus 10 recognizes the specification of "Platen Input" and "Main Scan" and executes the scanning process by the main scan parameters (job parameters, temporary parameters and standard parameters. See FIG. 4 for the sequence of application) on the original on the platen by the image reading section 100 without feeding the original (S1203). This main scan is a process for taking in high-resolution images to utilize for various purposes. Then, the image inputting apparatus 10 transfers the image data obtained through this main scan process to the external control unit 20 via the external connecting cable 30 (S1204) and sends a notification of completion of process to the external control unit 20 when the transfer is completed (S1205). When the external control unit 20 receives this notification (S1206), the process of this stage ends.

Stage 13

Figure 12:
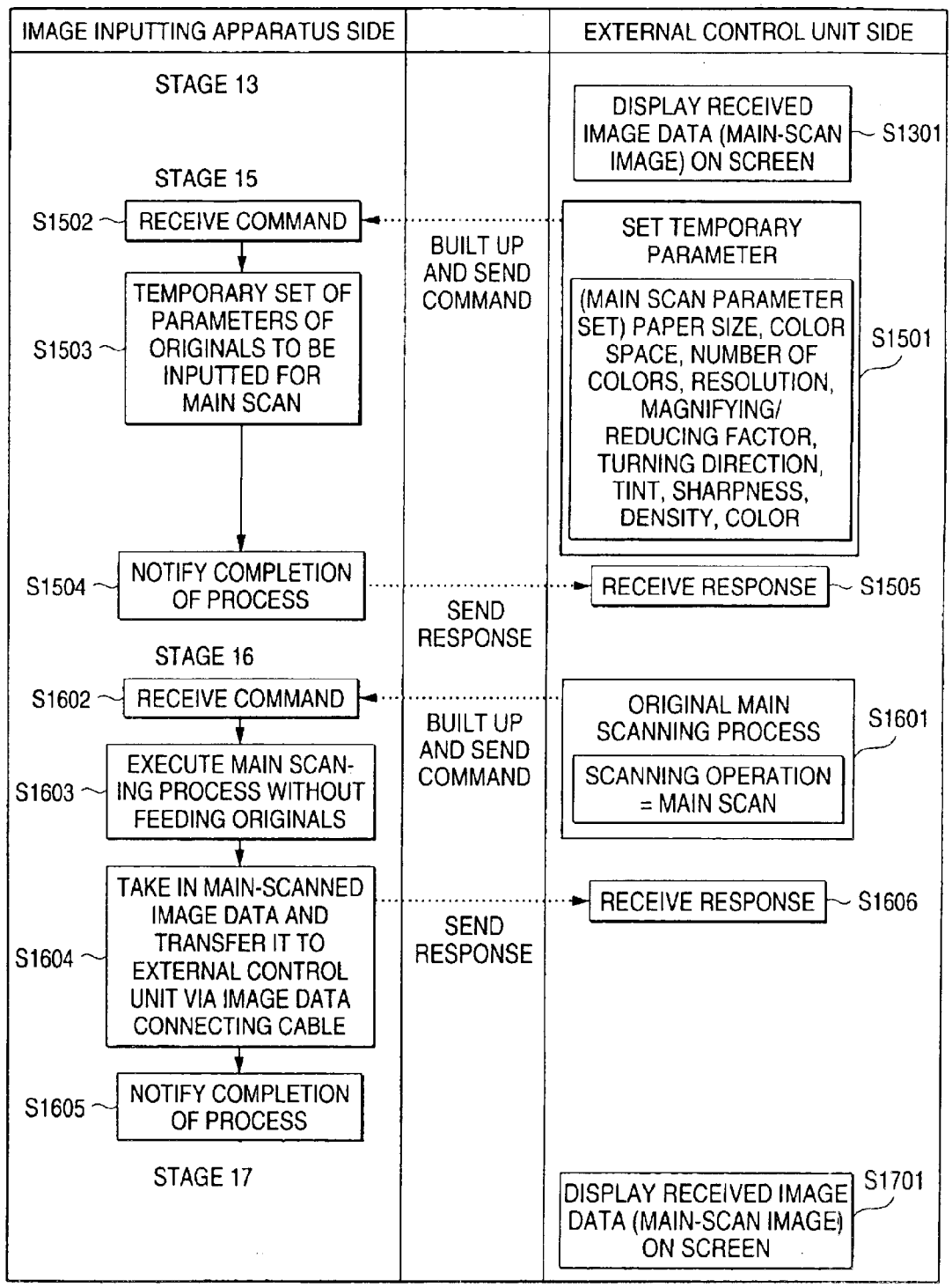
FIG. 12 shows the processing procedure of the system according to the embodiment of the invention.
Figure 13:
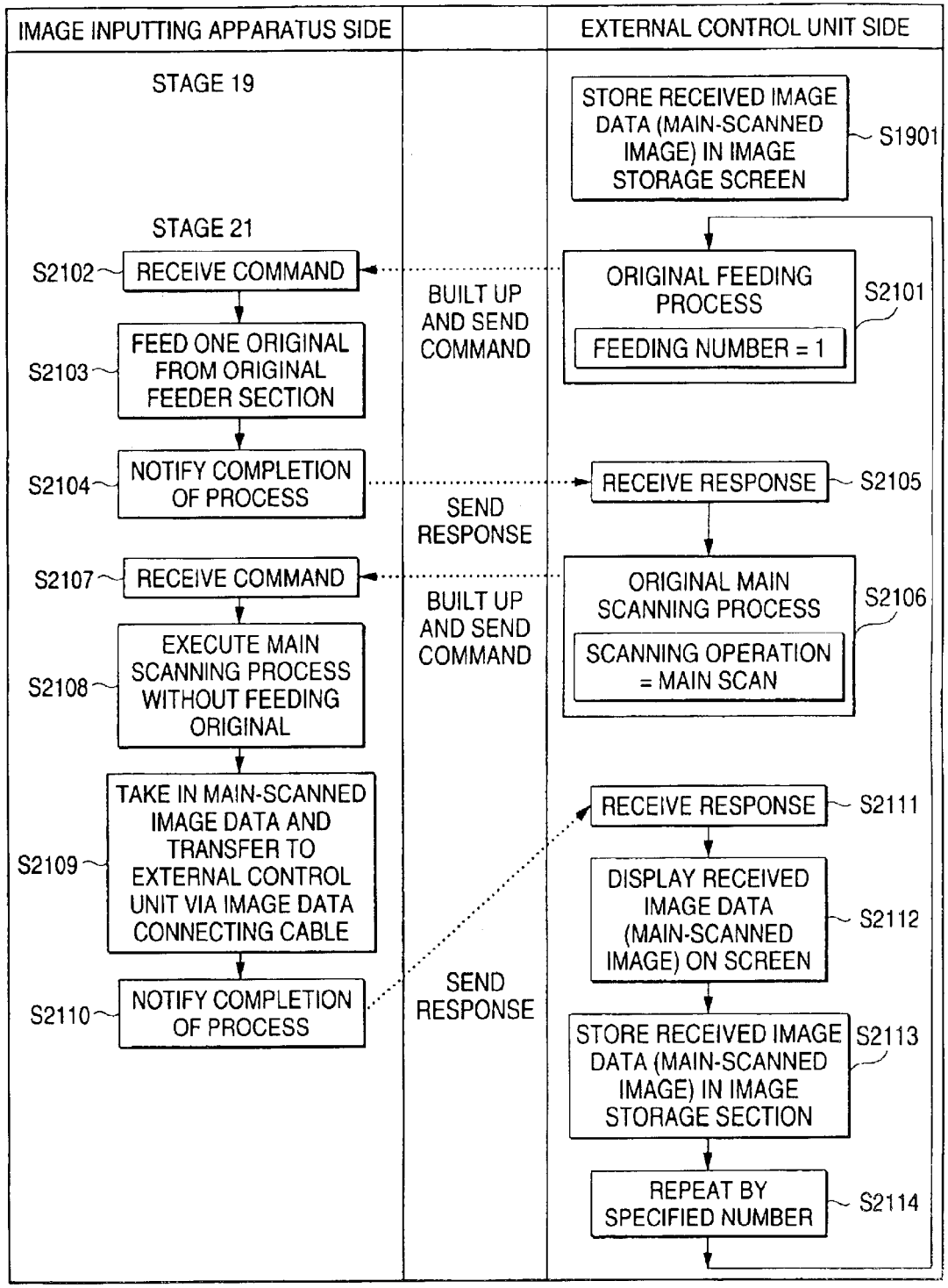
FIG. 13 shows the processing procedure of the system according to the embodiment of the invention.

The external control unit 20 which has received the result of the main scan displays it on the image display area 460 of the user interface screen 400 (S1301, see FIG. 12). The user confirms whether an image of the intended area could have been obtained by watching this screen display.

Stage 14

When the area of the read image is different from what has been intended by watching the screen display, the processes of Stages 11 through 13 are repeated (not shown).

Stages 15, 16 and 17

When it is judged that the image of the intended area could have been obtained in Stage 13, the main-scan process is implemented again on the original on the platen after setting or adjusting the various parameters such as density, tint and others.

While the second main scan is implemented by the procedure shown in Stages 15, 16 and 17, its explanation will be omitted here because this procedure is the same with the procedure shown in Stages 11 through 13.

Stage 18

The user confirms whether or not the result of the main scan obtained through Stages 15 through 17 satisfies the desired quality. When the result of the main scan is unsatisfactory, the processes of Stages 16 and 17 are repeated after adjusting the parameters in Stage 15 (not shown).

Stage 19

When the result of the main scan obtained through Stages 15 through 17 is satisfactory, the user instructs to store the image among the group of input images 465 on the image display area 460 in the image storage section 225 from the user interface screen 400 of the external control unit 20. Corresponding to that, the external control unit 20 stores the data of that image in the image storage section 225 (S1901, see FIG. 13).

Stage 20

It is noted that an image in a different area of the original on the platen or an image whose parameters such as tint are changed may be obtained by repeating the processes of Stages 11 through 19 again (not shown).

Stage 21

When the user confirms the result of the main scan and judges that the area to be read, density and color related parameters specified this time may be utilized on and after the next page in Stage 19, the specified number of originals on and after the next page may be main-scanned continuously under such parameter setting. Stage 21 shows a flow of such processes.

In this case, the user specifies the number by "Set Number" button, selects "Feeder Continuous Input" and either one of "Store File" or "Screen Display" and clicks the "Start Scan" button on the user interface screen 400 of the external control unit 20. Then, the external control unit 20 generates a feed processing command (S2101) per one page and sends it to the image inputting apparatus 10. When the image inputting apparatus 10 which has received such command feeds the original and notifies the result of that process (S2102 through S2104). Then, when the external control unit 20 receives the notification (S2105) and instructs the image inputting apparatus 10 to implement the main scan process (S2106), the image inputting apparatus 10 receiving such command implements the main scan process. When the image inputting apparatus 10 notifies the result of the process to the external control unit 20 (S2107 through S2110), the external control unit 20 receives the notification (S2111) and display the result of the main scan on the screen or stores in the image storage section 225 (S2112 and S2113) depending upon the setting. Here, the parameters set in Stages 11 and 15 are utilized as the temporary parameters of the main scan process. Then, the processes of S2101 through S2113 are repeated by the specified number of times (S2114).

Stage 22

When the image of the original on the platen needs not be read any more after ending Stage 19 or 21, the process returns to Stage 6 to feed the next original onto the platen and to repeat the processes on and after Stage 7 (not shown).

Stage 23

When no more original is left from the original feeder section 110 as the result of the repetition of the processes of Stages 4 through 22, the user implements the process to be implemented when the original feeding is completed in accordance to the setting in Stage 2.

Figure 14:
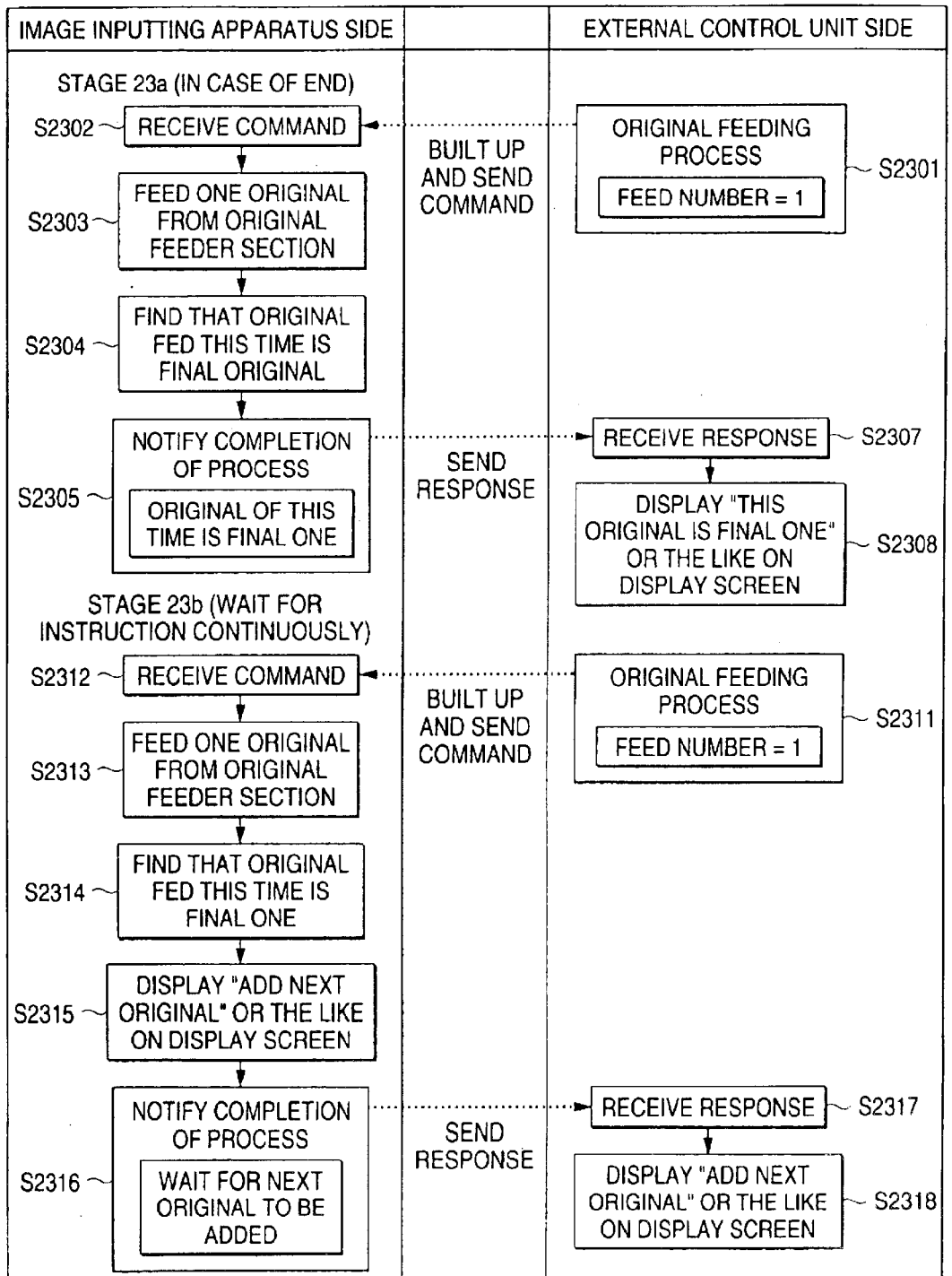
FIG. 14 shows the processing procedure of the system according to the embodiment of the invention.

When the setting in Stage 2 is "End" here, the image inputting apparatus 10 sends a notification indicating that no more original is left to the external control unit 20 as shown in Stage 23a in FIG. 14 and the external control unit 20 displays it on the user interface screen 400 for example.

That is, when the image inputting apparatus 10 which has received the original feeding command (S2301) from the external control unit 20 (S2302) feeds the originals in accordance to the command (S2303) and detects that the original fed this time is the last one as a result (S2304), the image inputting apparatus 10 creates a notification of completion of process (see Command No. 00 in FIG. 6) including the parameter that no more original is left and transmits it to the external control unit 20 (S2305). Receiving this response (S2306), the external control unit 20 displays as "This Original is Last One" for example on the user interface screen 400 (S2307) and then advances to Stage 26 to end the job.

When the setting in Stage 2 is "Inquire User Whether to Continue to Read", an inquiring message is displayed on the external control unit 20 to wait for an instruction from the user as shown in Stage 23b.

That is, when the image inputting apparatus 10 receiving the instruction to feed the original from the external control unit 20 (S2311 and S2312) feeds the original in accordance to the instruction (S2313) and detects that the original fed this time is the last one as a result (S2314), it displays "Add Next Original to Feeder" for example on the control instructing and displaying section 125 (S2315). Then, it creates a notification of completion of process including a parameter indicating the effect of waiting for an original to be added and transmits it to the external control unit 20 (S2316). Receiving this response (S2317), the external control unit 20 displays "Add Next Original to Feeder" for example on the user interface screen 400 (S2318). In this case, the process advances to Stage 24.

Stage 24

To the display of requesting to add the next original in Stage 23b, the user can select either to add the original or to end the job by stopping to add the original.

When the user ends this job, the user selects the buttons for managing jobs mentioned in Stage 1 to advance to Stage 26 (not shown).

Stage 25

When the user decides to add the original in Stage 23b, the user sets the additional original in the original feeder section 110 of the image inputting apparatus 10, opens the job management dialog by clicking the job management button on the user interface screen 400 of the external control unit 20, selects "Continue" of the job in that dialog and sends an instruction of continuing the process to the image inputting apparatus 10. Then, the processes on and after Stage 4 are repeated (not shown).

Stage 26

Figure 15:
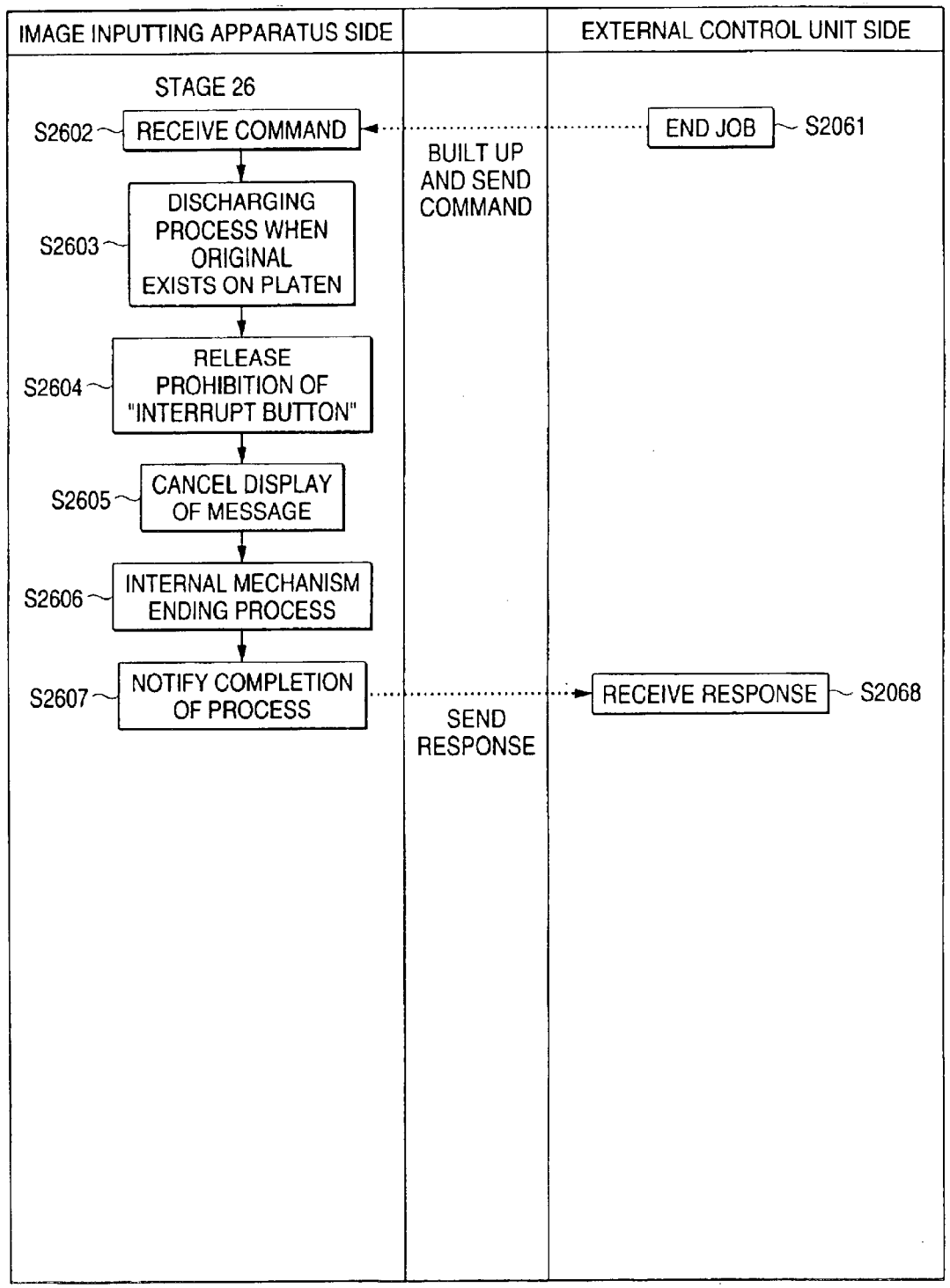
FIG. 15 shows the processing procedure of the system according to the embodiment of the invention.

When the end of the job is selected in Stage 23a or 24, a job ending process (Stage 26) shown in FIG. 15 is implemented. That is, the user calls out the job management dialog by the job management button on the user interface screen 400 and selects "End" of the job on the dialog (S2601). Then, a job ending command is generated and is sent to the image inputting apparatus 10. Receiving this command (S2602), the image inputting apparatus 10 discharges originals when they are left on the platen (S2603) and releases the setting for prohibiting to use the "Interrupt button" or for displaying the message of the effect that the image inputting apparatus is in use when they are set (S2604 and S2605). After implementing the internal mechanism ending process (S2606) thereafter, the image inputting apparatus 10 returns a notification of completion of process to the external control unit 20 (S2607). It is noted that the internal mechanism ending process includes a process for releasing the preset values in the job parameter setting section 132b and the temporary parameter setting section 132a. When the external control unit 20 receives this notification of completion of process (S2608), the series of scan jobs ends.

The flow of the typical reading process using the original feeder section 110 in the system of the embodiment has been explained above.

As described above, the embodiment allows the user to control the operation of the original feeder section 110 freely from the external control unit 20 and eliminates the cumbersome works of resetting the originals on the original feeder section 110 which have been carried out each time in the past in scanning and inputting areas per page from originals. That is, the embodiment allows the user to freely control the original feeder section 110 and the image reading section 100 basically only by the remote control from the external control unit 20 after setting a bunch of originals on the original feeder section 110 of the image inputting apparatus 10 once and to implement the various processes which could not be done in the past by combining the operation of the original feeder section 110 with the operation of the image reading section 100. Further, when the image inputting apparatus 10 is located at a place distant from the external control unit 20 where the user is present, it is possible to prevent interruption to the scan job by causing the image inputting apparatus 10 to indicate "In Use" or by nullifying the "Interrupt Button" of the image inputting apparatus 10.

It is noted that the concept of the embodiment described above is naturally applicable not only to an apparatus of a simplex scanner but also to a so-called digital complex machine provided with various functions of a scanner, a printer, a copier, a facsimile and the like.

Further, the case of utilizing the image inputting apparatus 10 by controlling from the external control unit 20 and the case of utilizing the copier as a scanner by controlling from the external control unit 20 have been exemplified above, the same functions are applicable to the case of implementing "Edition of Original" during copying such as excerption and coloring of an image in a copier by utilizing the original feeder section (although the read image is not stored as digital data but is "printed" on a medium such as a paper, the process related to "reading" is basically common to them).

Still more, the case of controlling the image inputting apparatus 10 from the external control unit 20 by the commands have been mainly explained above, the inventive function of independently controlling the original feeder section 110 and the image reading section 100 may be utilized from the control instructing and displaying section 125 of the image inputting apparatus 10 and the same effect with the control from the external control unit 20 can be obtained.

While the preferred embodiment has been described, variations thereto will occur to those skilled in the art within the scope of the present inventive concepts which are delineated by the following claims.

What is claimed is:

1. An image inputting apparatus, comprising:
    an image reading section that optically reads an original;
    an original feeder section that automatically feeds the original to the image reading section;
    a control section capable of receiving a command for the image reading section and a command for the original feeder section and of controlling the image reading section and the original feeder section independently from each other in response to the received command,
    a temporary parameter holding section that receives and holds a designated value of each processing parameter applied to one or a plurality of originals to be read in response to one reading command; and
    a job parameter holding section that receives and holds a designated value of each processing parameter applied to the one or the plurality of originals placed on the original feeder section,
    wherein, when the reading command is received, the control section refers to the temporary parameter holding section and the job parameter holding section, and controls the image reading section and the original feeder section by using the value held in the temporary parameter holding section for the processing parameter held in the temporary parameter holding section and by using the value held in the job parameter holding section for processing parameters other than that held in the temporary parameter holding section.

2. The image inputting apparatus according to claim 1, wherein the control section has a function of executing only an original feeding process without reading an image by operating the original feeder section in response to the command for the original feeder section without operating the image reading section.

3. The image inputting apparatus according to claim 2, wherein a number of originals to be fed is specified in the command for the original feeder section and the control section causes the original feeder section to feed the original continuously by the number of originals specified in the command.

4. The image inputting apparatus according to claim 1, wherein the control section has a function of executing only the process for reading the image without feeding the original by operating only the image reading section in response to the command for the image reading section without operating the original feeder section even when the original is placed on the original feeder section.

5. The image inputting apparatus according to claim 1, further comprising:
    an external parameter holding section that receives and holds an instruction from the outside specifying either of judging as ending the input, or of inquiring to a user whether the input is to be continued and executing a process in accordance with an answer to the inquiry as a processing parameter when no original is left in the original feeder section as a result of the original feeding process.

6. The image inputting apparatus according to claim 5, wherein the inquiry to the user is displayed at least on one of a console panel of the image inputting apparatus itself or on an external unit which has given the instruction to the image inputting apparatus in making the inquiry to the user whether to continue to input when no original is left on the original feeder section.

7. The image inputting apparatus according to claim 1, further comprising:
    a displaying section that shows the image inputting apparatus is in use on a display of the image inputting apparatus or on an external unit when a processing request is made from the external unit.

8. The image inputting apparatus according to claim 1, further comprising:
    a limiting section that limits, when a processing request is made from an external unit, at least a part of the other processing request made from the other external units.

9. An image inputting apparatus, comprising:
    an image reading section that optically reads an original;
    an original feeder section that feeds the original to the image reading section, an operation of the original feeder section being controlled according to an operation of the image reading section in response to a command for the image reading section;
    a control section that independently controls the original feeder section when a command for the original feeder section is received;
    a temporary parameter holding section that receives and holds a designated value of each processing parameter applied to one or a plurality of originals to be read in response to one reading command; and a job parameter holding section that receives and holds a designated value of each processing parameter applied to the one or the plurality of originals placed on the original feeder section, wherein, when the reading command is received, the control section refers to the temporary parameter holding section and the job parameter holding section, and controls the image reading section and the original feeder section by using the value held in the temporary parameter holding section for the processing parameter held in the temporary parameter holding section and by using the value held in the job parameter holding section for processing parameters other than that held in the temporary parameter holding section.

10. The image inputting apparatus according to claim 9, wherein the control section has a function of executing only an original feeding process without reading an image by operating the original feeder section in response to the command for the original feeder section without operating the image reading section.

11. The image inputting apparatus according to claim 10, wherein a number of originals to be fed is specified in the command for the original feeder section and the control section causes the original feeder section to feed the original continuously by the number of originals specified in the command.

12. The image inputting apparatus according to claim 9, wherein the control section has a function of executing only the process for reading the image without feeding the original by operating only the image reading section in response to the command for the image reading section without operating the original feeder section even when the original is placed on the original feeder section.

13. An image inputting apparatus, comprising:

an image reading section that optically reads an original; and an original feeder section that feeds the original to the image reading section, wherein, in response to a command from the outside, the original placed on the original feeder section is processed in one of the following three modes:

a continuous mode of continuously reading the plurality of originals placed on the original feeder section under the same processing parameter;

an individual mode of reading the plurality of originals placed on the original feeder section by receiving a processing parameter for each original; and a feed mode of only feeding a specified number of originals from among the plurality of originals placed on the original feeder section without implementing a reading process; and wherein the continuous mode has the following two types to be selected;

continuously reading all of the plurality of originals placed on the original feeder section; and continuously reading the specified number of originals.

14. The image inputting apparatus according to claim 13, further comprising:

a temporary parameter holding section that receives and holds a designated value of each processing parameter applied to one or a plurality of originals to be read in response to one reading command; and a job parameter holding section that receives and holds a designated value of each processing parameter applied to all of the plurality of originals placed on the original feeder section in principle, wherein, when the reading command is received, the control section refers to the temporary parameter holding section and the job parameter holding section, and controls the image reading section and the original feeder section by using the value held in the temporary parameter holding section for the processing parameter held in the temporary parameter holding section and by using the value held in the job parameter holding section for processing parameters other than that held in the temporary parameter holding section.

15. An image inputting apparatus, comprising:

an image reading section that optically reads an original;

an original feeder section that automatically feeds the original to the image reading section;

a temporary parameter holding section that receives and holds a designated value of each processing parameter applied to one or a plurality of originals to be read in response to one reading command;

a job parameter holding section that receives and holds a designated value of each processing parameter applied to all of the plurality of originals placed on the original feeder section in principle; and a control section that, when the reading command is received, refers to the temporary parameter holding section and the job parameter holding section, and controls the image reading section and the original feeder section by using the value held in the temporary parameter holding section for the processing parameter held in the temporary parameter holding section and by using the value held in the job parameter holding section for processing parameters other than that held in the temporary parameter holding section.

16. The image inputting apparatus according to claim 15, further comprising:

a standard parameter holding section that holds a default value for each processing parameter to be used when no designation is made from the outside, wherein the control section controls the image reading section by using the default value held in the standard parameter holding section for a processing parameter whose designated value is held neither in the temporary parameter holding section nor the job parameter holding section.

17. An image inputting system, comprising:

an image inputting apparatus that comprises an image reading section for reading an image of an original, an original feeder section for automatically feeding the original to the image reading section, and a control section; and an external control unit that requests the image inputting apparatus to implement an image reading process, wherein the control section supports a command for operating the original feeder section and a command for operating the image reading section as a command interface to the external control unit, and operates the original feeder section and the image reading section independently from each other in response to the command from the external control unit;

a temporary parameter holding section that receives and holds a designated value of each processing parameter applied to one or a plurality of originals to be read in response to one reading command; and a job parameter holding section that receives and holds a designated value of each processing parameter applied to the one or the plurality of originals placed on the original feeder section, wherein, when the reading command is received, the control section refers to the temporary parameter holding section and the job parameter holding section, and controls the image reading section and the original feeder section by using the value held in the temporary parameter holding section for the processing parameter held in the temporary parameter holding section and by using the value held in the job parameter holding section for processing parameters other than that held in the temporary parameter holding section.

18. A method for controlling an image inputting apparatus having an image reading section for optically reading an original and an original feeder section for automatically feeding the original to the image reading section, comprising the steps of:

defining a command for the image reading section and a command for the original feeder section;

judging whether a received command is intended for the image reading section or the original feeder section; and controlling the image reading section and the original feeder section independently from each other based on the judgment;

receiving and holding a designated value of a processing parameter applied to one or a plurality of originals to be read in response to the reading command; and receiving and holding a designated value of the processing parameter applied to the one or the plurality of originals placed on an original feeder section, wherein, the image reading section and the original feeder section are controlled when the reading command is received.

* * * * *